US012784464B2

(12) United States Patent
Sridhar et al.

(10) Patent No.: US 12,784,464 B2
(45) Date of Patent: Nov. 3, 2026

(54) DEVICES, METHODS, AND SYSTEMS FOR AUTOMATICALLY DETECTING BUS LANE MOVING VIOLATIONS

(71) Applicant: Hayden AI Technologies, Inc., San Francisco, CA (US)

(72) Inventors: Rahul Sridhar, San Francisco, CA (US); Shaocheng Wang, Mountain View, CA (US); Michael Gleeson-May, Oakland, CA (US); Vaibhav Ghadiok, Mountain View, CA (US)

(73) Assignee: Hayden AI Technologies, Inc., San Francisco, CA (US)

( * ) Notice: Subject to any disclaimer, the term of this patent is extended or adjusted under 35 U.S.C. 154(b) by 182 days.

(21) Appl. No.: 18/917,537

(22) Filed: Oct. 16, 2024

(65) Prior Publication Data

US 2025/0200986 A1 Jun. 19, 2025

Related U.S. Application Data

(60) Provisional application No. 63/611,468, filed on Dec. 18, 2023.

(51) Int. Cl.
*G06V 20/58* (2022.01)
*G06T 7/11* (2017.01)
(Continued)

(52) U.S. Cl.
CPC ................ *G06V 20/58* (2022.01); *G06T 7/11* (2017.01); *G06T 7/246* (2017.01); *G06V 10/764* (2022.01);
(Continued)

(58) Field of Classification Search
CPC .......... G06N 3/0464; G06N 3/08; G06N 3/09; G06N 3/04; G06N 20/00; G06N 3/045;
(Continued)

(56) References Cited

U.S. PATENT DOCUMENTS

| | | | |
|---|---|---|---|
| 9,070,289 | B2 | 6/2015 | Saund et al. |
| 10,296,794 | B2 | 5/2019 | Ratti |

(Continued)

FOREIGN PATENT DOCUMENTS

| | | |
|---|---|---|
| CN | 2277104 | 3/1998 |
| CN | 106560861 | 4/2017 |

(Continued)

OTHER PUBLICATIONS

"Consulting services in Computer Vision and AI," accessed on May 8, 2023, online.

(Continued)

*Primary Examiner* — Alex Kok S Liew
(74) *Attorney, Agent, or Firm* — Chang & Hale LLP

(57) ABSTRACT

Disclosed herein are methods, devices, and systems for detecting bus lane moving violations. One aspect of the disclosure concerns a method comprising capturing a video showing a vehicle located in a bus lane, inputting video frames from the video to an object detection deep learning model to detect the vehicle and bound the vehicle in a vehicle bounding polygon, determining a trajectory of the vehicle in an image space of the video frames, transforming the trajectory of the vehicle in the image space into a trajectory of the vehicle in a GPS space, inputting the trajectory of the vehicle in the GPS space to a vehicle movement classifier to yield a movement class prediction and a class confidence score, and evaluating the class confidence score against a predetermined threshold based on the movement class prediction to determine whether the vehicle was moving when located in the bus lane.

22 Claims, 15 Drawing Sheets

(51) Int. Cl.

| | |
|---|---|
| ***G06T 7/246*** | (2017.01) |
| ***G06V 10/764*** | (2022.01) |
| ***G06V 10/82*** | (2022.01) |
| ***G06V 20/56*** | (2022.01) |
| *G06V 20/62* | (2022.01) |

(52) U.S. Cl.
CPC ............ *G06V 10/82* (2022.01); *G06V 20/588* (2022.01); *G06T 2207/10016* (2013.01); *G06T 2207/20081* (2013.01); *G06T 2207/20084* (2013.01); *G06T 2207/30241* (2013.01); *G06T 2207/30256* (2013.01); *G06V 20/625* (2022.01); *G06V 2201/08* (2022.01)

(58) Field of Classification Search
CPC ...... G06N 3/096; G06N 3/0442; G06N 3/092; G06N 3/091; G06N 3/0495; G06N 3/082; G06N 3/0455; G06N 5/046; G06N 3/044; G06N 3/084; G06N 7/01; G06N 3/0895; G06N 3/0475; G06N 3/094; G06N 3/048; G06N 3/0499; G06N 3/098; G06N 3/0985; G06N 20/20; G06N 3/047; G06N 3/063; G06N 5/01; G06V 20/58; G06V 10/764; G06V 10/82; G06V 20/56; G06V 20/188; G06V 10/56; G06V 10/44; G06V 10/761; G06V 20/20; G06V 20/70; G06V 20/584; G06V 10/771; G06V 20/588; G06V 10/26; G06V 10/70; G06V 10/25
See application file for complete search history.

(56) References Cited

U.S. PATENT DOCUMENTS

| | | | | |
|---|---|---|---|---|
| 11,003,919 | B1 | 5/2021 | Ghadiok et al. | |
| 11,164,014 | B1 * | 11/2021 | Ghadiok | G06V 20/588 |
| 11,322,017 | B1 | 5/2022 | Ghadiok et al. | |
| 11,361,558 | B2 | 6/2022 | Seo | |
| 11,688,182 | B2 | 6/2023 | Ghadiok et al. | |
| 2002/0072847 | A1 | 6/2002 | Trajkovic et al. | |
| 2010/0081200 | A1 | 4/2010 | Rajala et al. | |
| 2012/0148092 | A1 | 6/2012 | Ni et al. | |
| 2013/0054106 | A1 * | 2/2013 | Schmudderich | B60W 30/0956 701/1 |
| 2013/0266188 | A1 | 10/2013 | Bulan et al. | |
| 2014/0007762 | A1 | 1/2014 | Gavish et al. | |
| 2014/0036076 | A1 | 2/2014 | Nerayoff et al. | |
| 2014/0311456 | A1 | 10/2014 | Richter et al. | |
| 2018/0172454 | A1 | 6/2018 | Ghadiok et al. | |
| 2018/0232583 | A1 * | 8/2018 | Wang | G06V 10/82 |
| 2018/0240336 | A1 | 8/2018 | Kareev et al. | |
| 2019/0137280 | A1 | 5/2019 | Ghadiok et al. | |
| 2019/0197369 | A1 | 6/2019 | Law et al. | |
| 2020/0063866 | A1 | 2/2020 | Reinhart et al. | |
| 2020/0177767 | A1 | 6/2020 | Kelly et al. | |
| 2020/0210769 | A1 * | 7/2020 | Hou | G06F 18/211 |
| 2020/0380270 | A1 | 12/2020 | Cox et al. | |
| 2021/0025713 | A1 * | 1/2021 | Ma | G01C 21/1656 |
| 2021/0166145 | A1 | 6/2021 | Omari et al. | |
| 2021/0209941 | A1 | 7/2021 | Maheshwari et al. | |
| 2021/0237737 | A1 | 8/2021 | Al-Nuaimi et al. | |
| 2021/0241003 | A1 | 8/2021 | Seo | |
| 2022/0147745 | A1 | 5/2022 | Ghadiok et al. | |

FOREIGN PATENT DOCUMENTS

| | | |
|---|---|---|
| CN | 110197589 | 9/2019 |
| CN | 110321823 | 10/2019 |
| CN | 110717433 | 1/2020 |
| CN | 111368687 | 7/2020 |
| CN | 111492416 | 8/2020 |
| CN | 111666853 | 9/2020 |
| JP | 4805763 | 3/2008 |
| KR | 100812397 | 3/2008 |
| WO | WO 2010/081200 | 7/2010 |
| WO | WO 2014/007762 | 1/2014 |
| WO | WO 2020/063866 | 4/2020 |
| WO | WO 2020/177767 | 9/2020 |
| WO | WO 2022/099237 | 5/2022 |

OTHER PUBLICATIONS

"Safety Vision Announces Smart Automated Bus Lane Enforcement (SABLETM) Solution," Safety Vision, Oct. 11, 2022, online.

Bo, T. et al., "Common phase error estimation in coherent optical OFDM systems using best-fit bounding box," *Optics Express*, vol. 24, No. 21, pp. 73707-23718, Oct. 2016.

Bo, T. et al., "Common Phase Estimation in Coherent OFDM System Using Image Processing Technique," *IEEE Photonics Technology Letters*, vol. 27, No. 15, pp. 1597-1600, Aug. 2015.

Bo, T. et al., "Image Processing Based Common Phase Estimation for Coherent Optical Orthogonal Frequency Division Multiplexing System," *Optical Fiber Communication Conference*, Mar. 2015.

Canizo, M. et al. "Multi-Head CNN-RNN for multi time series anomaly detection: An industrial case study," *Neurocomputing*, vol. 363(21), pp. 246-260, Oct. 21, 2019.

Chen, S. et al., "A Dense Feature Pyramid Network-Based Deep Learning Model for Road Marking Instance Segmentation Using MLS Point Clouds," *IEEE Transactions on Geoscience and Remote Sensing*, vol. 59, No. 1, pp. 784-800, Jan. 2021.

Chhaya, S. et al., "Basic Geometric Shape and Primary Colour Detection Using Image Processing on MATLAB," *IJRET: International Journal of Research in Engineering and Technology*, vol. 04, iss. 05, pp. 505-509, May 2015.

Clearlane, "Automated Bus Lane Enforcement System", *SafeFleet*, 2021, online.

Clearlane, "The Safe Fleet Automated Bus Lane Enforcement (ABLE)", *SafeFleet*, 2021, online.

Evanko, K. "Siemens Mobility launches first-ever mobile bus lane enforcement solution in New York," *Siemens Mobility*, Dec. 17, 2019, Munich, Germany.

Fan, Y. et al., "A Coarse-to-Fine Framework for Multiple Pedestrian Crossing Detection," *Sensors*, vol. 20, 4144, pp. 1-16, Jul. 2020.

Franklin, R. "Traffic Signal Violation Detection using Artificial Intelligence and Deep Learning," *Department of Electronic & Telecommunication Engineering, RV College of Engineering*, pp. 839-844, accessed on Jul. 19, 2020, Karnataka, India.

Github Repository, Our Camera, <https://github.com/Bellspringsteen/OurCamera> (last visited Sep. 25, 2023).

Glenn, J., "Adaptive Morphological Feature-Based Object Classifier for a Color Imaging System," *NASA Tech Briefs*, pp. 23-24, Dec. 2009.

Gui, Z. et al., "Dyanmic Perception-Based Vehicle Trajectory Prediction Using a Memory-Enhanced Spatio-Temporal Graph Network," *International Journal of Geo-Information*, pp. 1-14, May 2024.

Hsu, K., et al. "Augmented Multiple Instance Regression for Inferring Object Contours in Bounding Boxes," *IEEE Transaction on Image Processing*, vol. 23, No. 4, pp. 1722-1736, Apr. 2014.

Huval, B. et al. "An Empirical Evaluation of Deep Learning on Highway Driving," *Stanford University*, pp. 1-7 accessed on Apr. 17, 2015, online.

Jiang, R. et al., "Spatial-Temporal Attentive LSTM for Vehicle-Trajectory Prediction," *International Journal of Geo-Information*, pp. 1-13, Jun. 2022.

Lin, L. et al., "Vehicle Trajectory Prediction Using LSTMs with Spatial-Temporal Attention Mechanisms," in IEEE Intelligent Transportation Systems Magazine, vol. 14, No. 2, pp. 197-208, Mar.-Apr. 2022.

Liu, X. "Vehicle-Related Scene Understanding Using Deep Learning," *School of Engineering, Computer and Mathematical Sciences, Auckland University of Technology*, 2019, online.

Nehemiah, A. et al. "Deep Learning for Automated Driving with Matlab," *NVIDIA Technical Blog*, <https://developer.nvidia.com/blog/deep-learning-automated-driving-matlab/> accessed on Jun. 4, 2023, online.

(56) References Cited

OTHER PUBLICATIONS

Novak, L., "Vehicle Detection and Pose Estimation for Autonomous Driving," *Czech Technical University in Prague*, May 2017.
Oh, J. et al., "Context-based abnormal object detection using the fully-connected conditional random fields," *Pattern Recognition Letters*, vol. 98, pp. 16-25, Aug. 2017.
Paquet, E. et al., "Description of shape information for 2-D and 3-D objects," Signal Processing: Image Communication, vol. 16, pp. 103-122, Sep. 2000.
Safe Fleet. "Whitepaper: Vendor Interoperability for ABLE," *Safe Fleet*, pp. 1-6, Apr. 2023, online.
Sengupta, S., "Semantic Mapping of Road Scenes," *Oxford Brookes University*, Oct. 2014.
Siemens Mobility Inc., "Ratification of Completed Procurement Actions," New York City Transit and Siemens Mobility Inc., *Finance Committee Meeting*, pp. 80-81, Mar. 2019.
Siemens Mobility Traffic Solutions, "Enforcement solutions for safe and efficient cities," *Civil Enforcement*, 2016.
Spencer, B. et al., "NYC extends Brooklyn bus lane enforcement," *ITS International*, Feb. 27, 2020, online.
Sullivan, T., "Transit Bus Surveillance Solutions," *New York City Transit/MTA Bus*, Jun. 21, 2019, Charlotte, North Carolina, USA.
Tonge, A. et al., "Traffic Rules Violation Detection using Deep Learning," *2020 4th International Conference on Electronics, Communication and Aerospace Technology(ICECA)*, pp. 1250-1257, Nov. 2020, Coimbatore, India.
Viorel, C., "Some Aspects Concerning Geometric Forms Automatically Find Images and Ordering Them Using Robot Studio Simulation," *Advanced Materials Research*, vol. 1036, pp. 760-763, Oct. 1, 2014.
Wu, C. et al., "Adjacent Lane Detection and Lateral Vehicle Distance Measurement Using Vision-Based Neuro-Fuzzy Approaches," *Journal of Applied Research and Technology*, vol. 11, pp. 251-258, Apr. 2013.
Yu, D. et al., "Vehiclke Trajectory Prediction with Lane Stream Attention-Based LSTMs and Road Geometry Linearization," Sensors, pp. 1-19, Dec. 2021.
Zhao Z. et al., "Deep Reinforcement Learning Based Lane Detection and Localization," *Neurocomputing*, vol. 413, pp. 328-338, Jul. 2020.
Zhou, C. et al., "Predicting the passenger demand on bus services for mobile users," *Pervasive and Mobile Computing*, vol. 25, pp. 48-66, Jan. 2016.

* cited by examiner

DEVICES, METHODS, AND SYSTEMS FOR AUTOMATICALLY DETECTING BUS LANE MOVING VIOLATIONS

CROSS-REFERENCE TO RELATED APPLICATION

This application claims the benefit of U.S. Provisional Patent Application No. 63/611,468 filed on Dec. 18, 2023, the content of which is incorporated herein by reference in its entirety.

TECHNICAL FIELD

This disclosure relates generally to the field of computer-based traffic violation detection and, more specifically, to systems and methods for automatically detecting bus lane moving violations.

BACKGROUND

Non-public vehicles driving in bus lanes or bike lanes is a significant transportation problem for municipalities, counties, and other government entities. Vehicles driving in bus lanes can slow down buses, thereby frustrating those that depend on public transportation and result in decreased ridership. On the contrary, as buses speed up due to bus lanes remaining unobstructed, reliability improves, leading to increased ridership, less congestion on city streets, and less pollution overall. While some cities have put in place Clear Lane Initiatives aimed at improving bus speeds, enforcement of bus lane violations is often lacking and the reliability of multiple buses can be affected when bus lanes are not clear.

Similarly, vehicles driving in bike lanes can force bicyclists to ride on the road, making their rides more dangerous and discouraging the use of bicycles as a safe and reliable mode of transportation.

Traditional photo-based enforcement technology and approaches are often unsuited for today's fast-paced environment. For example, photo-based enforcement systems often rely heavily on human reviewers to review and validate evidence packages containing images or videos captured by one or more stationary cameras. This requires large amounts of human effort and makes the process slow, inefficient, and costly. In particular, enforcement systems that rely on human reviewers are often not scalable, require more time to complete the validation procedure, and do not learn from their past mistakes. Furthermore, these photo-based traffic enforcement systems often fail to take into account certain factors that may provide clues as to whether a captured event is or is not a potential violation.

Even when a vehicle is detected in a bus lane or bike lane, another critical determination that must be made is whether the vehicle is moving or stopped. In most cases, this distinction will determine the type of violation assessed. For instance, many municipal transportation authorities issue two types of violations for vehicles located in a bus lane: a bus lane moving violation and a bus lane stopped violation. In other instances, a vehicle is required to drive at least 100 meters in a bus lane to be assessed a bus lane moving violation. Furthermore, the determination that a vehicle is moving is important to properly detect that a vehicle is not committing a parking violation.

Therefore, an improved solution is needed that can detect bus lane or bike lane moving violations automatically. Such a solution should be accurate, scalable, and cost-effective to deploy and operate. Also, any automated lane violation detection solution should be capable of detecting if a vehicle is moving or stopped in a restricted lane.

SUMMARY

Disclosed herein are methods, devices, and systems for detecting bus lane moving violations. One embodiment of the disclosure concerns a method comprising detecting a bus lane moving violation, comprising: capturing, using one or more cameras of an edge device, one or more videos comprising a plurality of video frames showing a vehicle located in a bus lane; inputting the video frames to an object detection deep learning model running on the edge device to detect the vehicle and bound the vehicle shown in each of the video frames in a vehicle bounding polygon; determining a trajectory of the vehicle in an image space of the video frames; transforming the trajectory of the vehicle in the image space into a trajectory of the vehicle in a GPS space; inputting the trajectory of the vehicle in the GPS space to a vehicle movement classifier to yield at least a movement class prediction and a class confidence score; and evaluating the class confidence score against a predetermined threshold based on the movement class prediction to determine whether the vehicle was moving when located in the bus lane.

In some embodiments, the method can also comprise transforming the trajectory of the vehicle in the image space into the trajectory of the vehicle in the GPS space using, in part, a homography matrix.

In some embodiments, the homography matrix can be a camera-to-GPS homography matrix that outputs an estimated distance to the vehicle from the edge device in the GPS space. The method can further comprise adding the estimated distance to the vehicle to GPS coordinates of the edge device to determine GPS coordinates of the vehicle.

In some embodiments, the class confidence score can be a numerical score between 0 and 1.0.

In some embodiments, the movement class prediction can be a vehicle stationary class. In these embodiments, the predetermined threshold can be a stopped threshold and the method can further comprise automatically determining that the vehicle was not moving in response to the class confidence score being higher than the stopped threshold.

In some embodiments, the movement class prediction can be a vehicle moving class. In these embodiments, the predetermined threshold can be a moving threshold and the method can further comprise automatically determining that the vehicle was moving in response to the class confidence score being higher than the moving threshold.

In some embodiments, the vehicle movement classifier can be a neural network. For example, the vehicle movement classifier can be a recurrent neural network. As a more specific example, the recurrent neural network can be a bidirectional long short-term memory (LSTM) network.

In some embodiments, the one or more videos can be captured by an event camera of the edge device coupled to a carrier vehicle while the carrier vehicle is in motion.

In some embodiments, the method can further comprise associating the vehicle bounding polygons of the vehicle across multiple video frames using a multi-object tracker prior to determining the trajectory of the vehicle in the image space.

In some embodiments, the method can further comprise replacing any of the vehicle bounding polygons with a replacement vehicle bounding polygon if any part of the vehicle bounding polygon touches a bottom edge or a right edge of the video frame. The replacement vehicle bounding polygon can be a last instance of the vehicle bounding polygon that does not touch the bottom edge or the right edge of the video frame.

In some embodiments, the method can further comprise inputting the video frames to a lane segmentation deep learning model to bound a plurality of lanes of a roadway detected from the video frames in a plurality of polygons. At least one of the polygons can be a lane-of-interest (LOI) polygon bounding the bus lane. The method can also comprise determining that the vehicle was located in the bus lane based in part on an overlap of at least part of the vehicle bounding polygon and at least part of the LOI polygon.

In some embodiments, a midpoint along a bottom of the vehicle bounding polygon can be used to represent the vehicle when transforming the vehicle from the image space into the GPS space.

Also disclosed is a device for detecting a bus lane moving violation. The device can comprise one or more cameras configured to capture one or more videos comprising a plurality of video frames showing a vehicle located in a bus lane. The device can also comprise one or more processors programmed to input the video frames to an object detection deep learning model running on the device to detect the vehicle and bound the vehicle shown in each of the video frames in a vehicle bounding polygon. The one more processors can also be programmed to determine a trajectory of the vehicle in an image space of the video frames, transform the trajectory of the vehicle in the image space into a trajectory of the vehicle in a GPS space, input the trajectory of the vehicle in the GPS space to a vehicle movement classifier to yield at least a movement class prediction and a class confidence score, and evaluate the class confidence score against a predetermined threshold based on the movement class prediction to determine whether the vehicle was moving when located in the bus lane.

Also disclosed is one or more non-transitory computer-readable media comprising instructions stored thereon, that when executed by one or more processors, cause the one or more processors to perform operations comprising inputting video frames of one or more videos to an object detection deep learning model to detect a vehicle and bound the vehicle shown in each of the video frames in a vehicle bounding polygon. The video frames can show the vehicle located in a bus lane. The operations can also comprise determining a trajectory of the vehicle in an image space of the video frames, transforming the trajectory of the vehicle in the image space into a trajectory of the vehicle in a GPS space, inputting the trajectory of the vehicle in the GPS space to a vehicle movement classifier to yield at least a movement class prediction and a class confidence score, and evaluating the class confidence score against a predetermined threshold based on the movement class prediction to determine whether the vehicle was moving when located in the bus lane.

Also disclosed is a system for detecting a bus lane moving violation. The system can comprise one or more cameras of an edge device configured to capture one or more videos comprising a plurality of video frames showing a vehicle located in a bus lane. The edge device can also comprise one or more processors programmed to input the video frames to an object detection deep learning model running on the edge device to detect the vehicle and bound the vehicle shown in each of the video frames in a vehicle bounding polygon. The system can also comprise a server configured to receive an evidence package from the edge device comprising the event video frames, metadata concerning the event video frames, and outputs from the object detection deep learning model. The one more processors of the server can be programmed to determine a trajectory of the vehicle in an image space of the video frames, transform the trajectory of the vehicle in the image space into a trajectory of the vehicle in a GPS space, input the trajectory of the vehicle in the GPS space to a vehicle movement classifier to yield at least a movement class prediction and a class confidence score, and evaluate the class confidence score against a predetermined threshold based on the movement class prediction to determine whether the vehicle was moving when located in the bus lane.

DETAILED DESCRIPTION

Figure 1A:
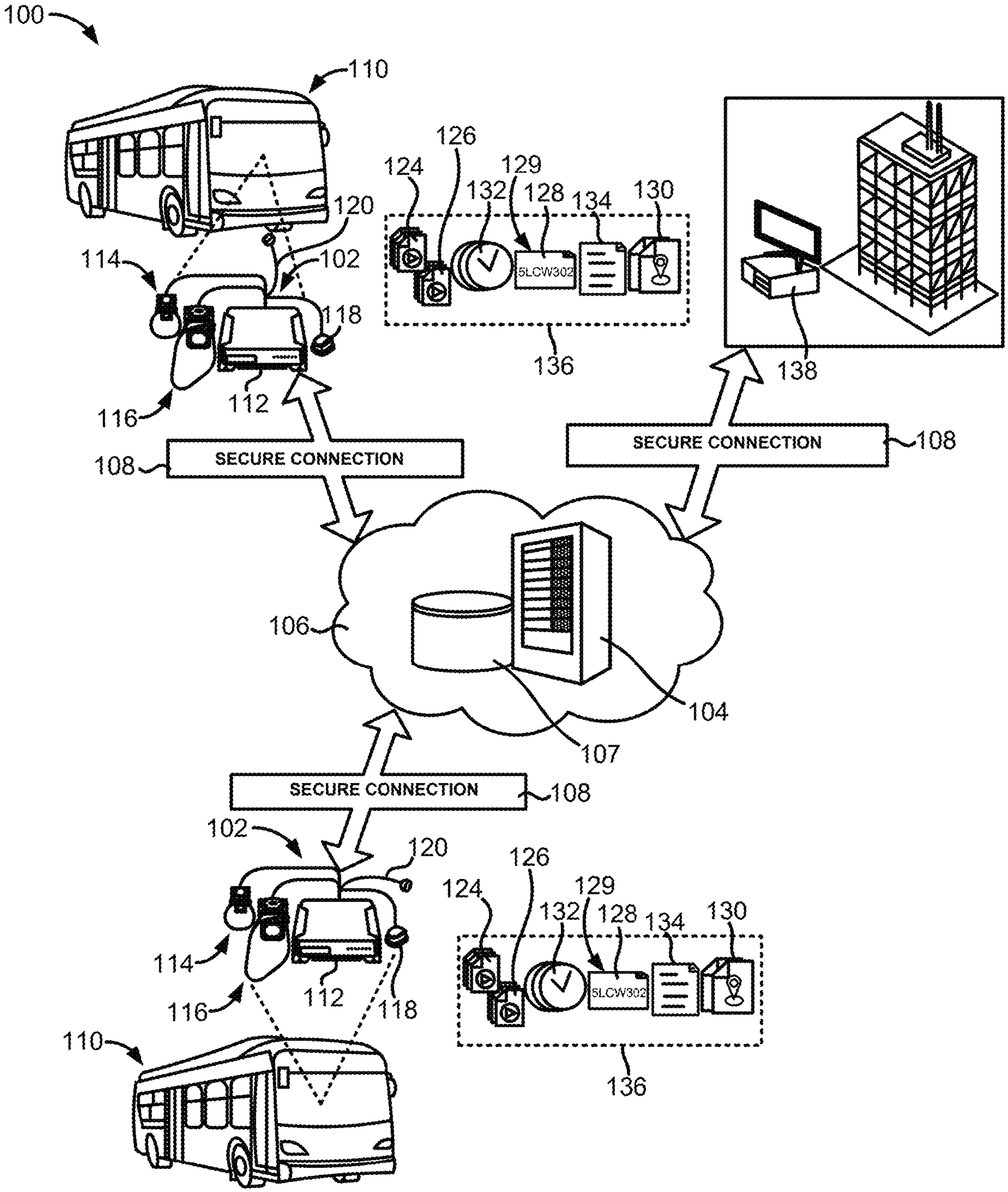
FIG. 1A illustrates one embodiment of a system for automatically detecting bus lane moving violations.

FIG. 1A illustrates one embodiment of a system 100 for automatically detecting bus lane moving violations. The system 100 can comprise a plurality of edge devices 102 communicatively coupled to or in wireless communication with a server 104 in a cloud computing environment 106.

The server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more stand-alone servers such as a rack-mounted server, a blade server, a mainframe, a dedicated desktop or laptop computer, one or more processors or processor cores therein, or a combination thereof.

The edge devices 102 can communicate with the server 104 over one or more networks. In some embodiments, the networks can refer to one or more wide area networks (WANs) such as the Internet or other smaller WANs, wireless local area networks (WLANs), local area networks (LANs), wireless personal area networks (WPANs), system-area networks (SANs), metropolitan area networks (MANs), campus area networks (CANs), enterprise private networks (EPNs), virtual private networks (VPNs), multi-hop networks, or a combination thereof. The server 104 and the plurality of edge devices 102 can connect to the network using any number of wired connections (e.g., Ethernet, fiber optic cables, etc.), wireless connections established using a wireless communication protocol or standard such as a 3G wireless communication standard, a 4G wireless communication standard, a 5G wireless communication standard, a long-term evolution (LTE) wireless communication standard, a Bluetooth™ (IEEE 802.15.1) or Bluetooth™ Lower Energy (BLE) short-range communication protocol, a wireless fidelity (WiFi) (IEEE 802.11) communication protocol, an ultra-wideband (UWB) (IEEE 802.15.3) communication protocol, a ZigBee™ (IEEE 802.15.4) communication protocol, or a combination thereof.

The edge devices 102 can transmit data and files to the server 104 and receive data and files from the server 104 via secure connections 108. The secure connections 108 can be real-time bidirectional connections secured using one or more encryption protocols such as a secure sockets layer (SSL) protocol, a transport layer security (TLS) protocol, or a combination thereof. Additionally, data or packets transmitted over the secure connection 108 can be encrypted using a Secure Hash Algorithm (SHA) or another suitable encryption algorithm. Data or packets transmitted over the secure connection 108 can also be encrypted using an Advanced Encryption Standard (AES) cipher.

The server 104 can store data and files received from the edge devices 102 in one or more databases 107 in the cloud computing environment 106. In some embodiments, the database 107 can be a relational database. In further embodiments, the database 107 can be a column-oriented or key-value database. In certain embodiments, the database 107 can be stored in a server memory or storage unit of the server 104. In other embodiments, the database 107 can be distributed among multiple storage nodes. In some embodiments, the database 107 can be an events database.

As will be discussed in more detail in the following sections, each of the edge devices 102 can be carried by or installed in a carrier vehicle 110 (see FIG. 1C for examples of different types of carrier vehicles 110).

For example, the edge device 102, or components thereof, can be secured or otherwise coupled to an interior of the carrier vehicle 110 immediately behind the windshield of the carrier vehicle 110.

As shown in FIG. 1A, each of the edge devices 102 can comprise a control unit 112, an event camera 114, a license plate recognition (LPR) camera 116, a communication and positioning unit 118, and a vehicle bus connector 120.

In some embodiments, the event camera 114 and the LPR camera 116 can be coupled to at least one of a ceiling and headliner of the carrier vehicle 110 with the event camera 114 and the LPR camera 116 facing the windshield of the carrier vehicle 110.

In other embodiments, the edge device 102, or components thereof, can be secured or otherwise coupled to at least one of a windshield, window, dashboard, and deck of the carrier vehicle 110. Also, for example, the edge device 102 can be secured or otherwise coupled to at least one of a handlebar and handrail of a micro-mobility vehicle serving as the carrier vehicle 110. Alternatively, the edge device 102 can be secured or otherwise coupled to a mount or body of an unmanned aerial vehicle (UAV) or drone serving as the carrier vehicle 110.

The event camera 114 can capture videos of vehicles (including a potentially offending vehicle 122, see, e.g., FIGS. 1B, 5A-5C, and 8A-8B) driving near the carrier vehicle 110. The videos captured by the event camera 114 can be referred to as event videos. Each of the event videos can be made up of a plurality of event video frames 124. The event video frames 124 can be processed and analyzed in real-time or near real-time to determine whether any of the vehicles have committed a bus lane moving violation.

For example, one or more processors of the control unit 112 can be programmed to apply a plurality of functions from a computer vision library 306 (see, e.g., FIG. 3) to the videos captured by the event camera 114 to automatically read and process the event video frames 124. The one or more processors of the control unit 112 can then pass at least some of the event video frames 124 to a plurality of deep learning models (see, e.g., FIG. 3) running on the control unit 112 of the edge device 102. The deep learning models can automatically identify objects from the event video frames 124 and classify such objects (e.g., a car, a truck, a bus, etc.). In some embodiments, the deep learning models can also automatically identify a set of vehicle attributes 134 of a potentially offending vehicle 122 (also referred to as a target vehicle) involved in a bus lane moving violation. The set of vehicle attributes 134 can include a color of the potentially offending vehicle 122, a make and model of the potentially offending vehicle 122, and a vehicle type of the potentially offending vehicle 122 (for example, if the potentially offending vehicle 122 is a personal vehicle or a municipal vehicle such as a fire truck, ambulance, parking enforcement vehicle, police car, etc.). The potentially offending vehicle 122 can be detected along with other vehicles in the event video frame(s) 124.

The LPR camera 116 can capture videos of license plates of the vehicles (including the potentially offending vehicle 122) driving near the carrier vehicle 110. The videos captured by the LPR camera 116 can be referred to as license plate videos. Each of the license plate videos can be made up of a plurality of license plate video frames 126. The license plate video frames 126 can be analyzed by the control unit 112 in real-time or near real-time to extract alphanumeric strings representing license plate numbers 128 of license plates 129 of the potentially offending vehicles 122. The event camera 114 and the LPR camera 116 will be discussed in more detail in later sections.

The communication and positioning unit 118 can comprise at least one of a cellular communication module, a WiFi communication module, a Bluetooth® communication module, and a high-precision automotive-grade positioning unit. The communication and positioning unit 118 can also comprise a multi-band global navigation satellite system (GNSS) receiver configured to concurrently receive signals from a global positioning system (GPS) satellite navigation system, a GLONASS satellite navigation system, a Galileo navigation system, and a BeiDou satellite navigation system.

The communication and positioning unit 118 can provide positioning data that can allow the edge device 102 to determine its own location at a centimeter-level accuracy. The communication and positioning unit 118 can also provide positioning data that can be used by the control unit 112 to determine a location 130 of a potentially offending vehicle 122. For example, the control unit 112 can use positioning data concerning its own location to estimate or calculate the location 130 of the potentially offending vehicle 122.

The edge device 102 can also comprise a vehicle bus connector 120. The vehicle bus connector 120 can allow the edge device 102 to obtain certain data from the carrier vehicle 110 carrying the edge device 102. For example, the edge device 102 can obtain wheel odometry data from a wheel odometer of the carrier vehicle 110 via the vehicle bus connector 120. Also, for example, the edge device 102 can obtain a current speed of the carrier vehicle 110 via the vehicle bus connector 120. As a more specific example, the vehicle bus connector 120 can be a J1939 connector. The edge device 102 can take into account the wheel odometry data to determine the location 130 of the potentially offending vehicle 122.

The edge device 102 can also record or generate at least a plurality of timestamps 132 marking the time when the potentially offending vehicle 122 was detected at a location 130. For example, the localization and mapping engine 302 of the edge device 102 can mark the time using a GPS timestamp, a Network Time Protocol (NTP) timestamp, a local timestamp based on a local clock running on the edge device 102, or a combination thereof. The edge device 102 can record the timestamps 132 from multiple sources to ensure that such timestamps 132 are synchronized with one another in order to maintain the accuracy of such timestamps 132.

In some embodiments, the edge devices 102 can transmit data, information, videos, and other files to the server 104 in the form of evidence packages 136. The evidence package 136 can comprise the event video frames 124 and the license plate video frames 126.

The evidence package 136 can also comprise at least one license plate number 128 of a license plate 129 recognized by the edge device 102 using the license plate video frames 126 as inputs, a location 130 of the potentially offending vehicle 122 determined by the edge device 102, the speed of the carrier vehicle 110 when the bus lane moving violation was detected, any timestamps 132 recorded by the control unit 112, and vehicle attributes 134 of the potentially offending vehicle 122 captured by the event video frames 124.

In other embodiments, an edge device 102 can transmit data, information, videos, and other files to the server 104 in the form of an evidence package 136 only if the edge device 102 detects that a bus lane moving violation has occurred.

FIG. 1A also illustrates that the server 104 can transmit certain data and files to a third-party computing device/resource and/or a client device 138. For example, the third-party computing device can be a server or computing resource of a third-party traffic violation processor. As a more specific example, the third-party computing device can be a server or computing resource of a government vehicle registration department. In other examples, the third-party computing device can be a server or computing resource of a sub-contractor responsible for processing traffic violations for a municipality or other government entity.

The client device 138 can refer to a portable or non-portable computing device. For example, the client device 138 can refer to a desktop computer or a laptop computer. In other embodiments, the client device 138 can refer to a tablet computer or smartphone.

The server 104 can also generate or render a number of graphical user interfaces (GUIs) 332 (see, e.g., FIG. 3) that can be displayed through a web portal or mobile app run on the client device 138.

The GUIs 332 can provide data or information concerning times/dates of bus lane moving violations and locations of the bus lane moving violations. The GUIs 332 can also provide a video player configured to play back video evidence of the bus lane moving violation.

In another embodiment, at least one of the GUIs 332 can comprise a live map showing real-time locations of all edge devices 102, bus lane moving violations, and violation hot-spots. In yet another embodiment, at least one of the GUIs 332 can provide a live event feed of all flagged events or bus lane moving violations and the validation status of such bus lane moving violations. The GUIs 332 and the web portal or app will be discussed in more detail in later sections.

The server 104 can also determine that a bus lane moving violation has occurred based in part on analyzing data and videos received from the edge device 102 and other edge devices 102.

Figure 1B:
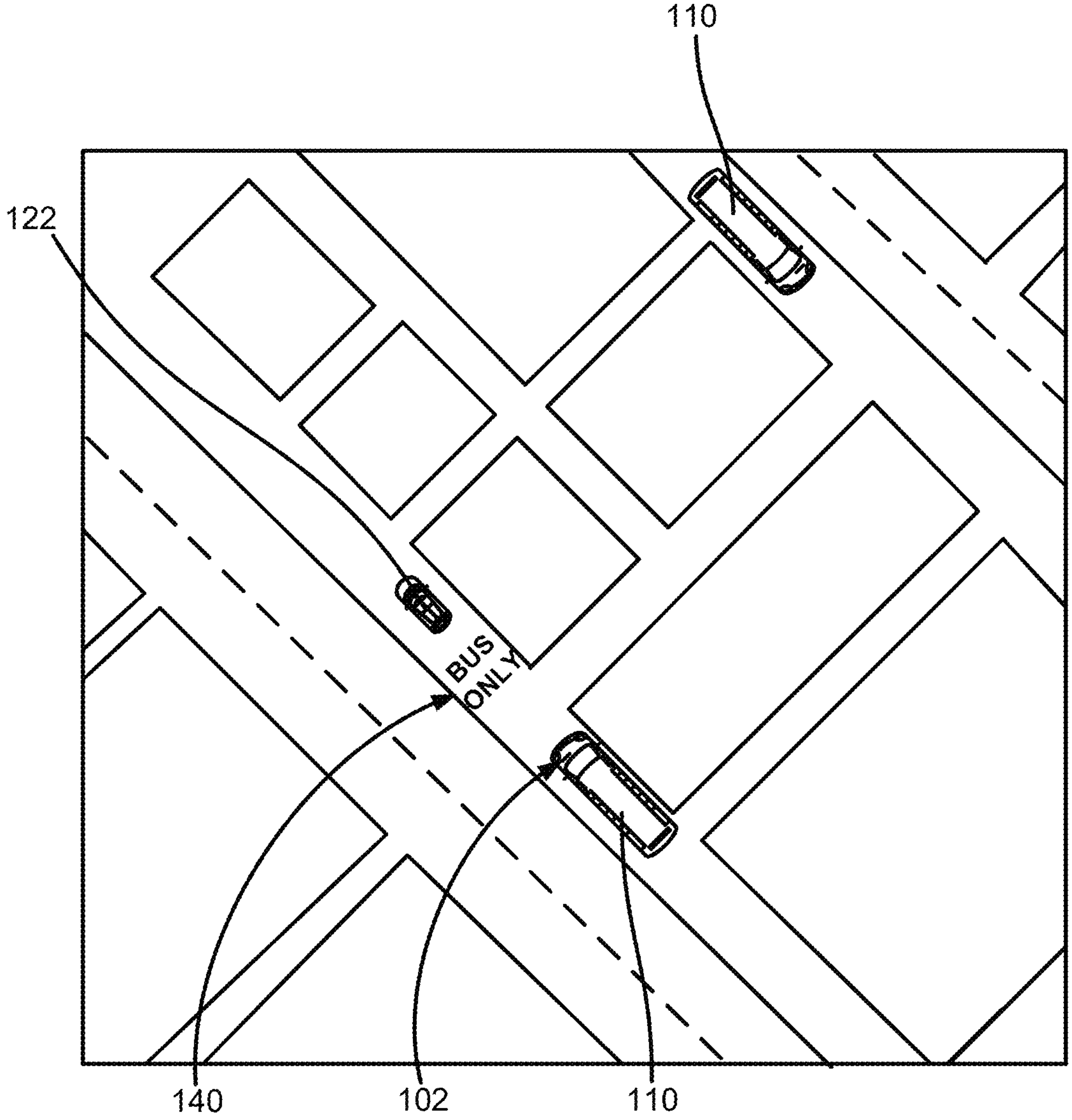
FIG. 1B illustrates one example scenario where the system of FIG. 1A can be utilized.

FIG. 1B illustrates an example scenario where the system 100 of FIG. 1A can be utilized to detect a bus lane moving violation. As shown in FIG. 1B, a potentially offending vehicle 122 can be driving in a restricted lane 140. In some embodiments, the restricted lane 140 can be a bus lane.

In other embodiments, the restricted lane 140 can be a bike lane. In these embodiments, the system 100 and methods disclosed herein can be utilized to automatically detect a bike lane moving violation.

A carrier vehicle 110 (see also, FIG. 1C) having an edge device 102 (see, e.g., FIG. 2A) mounted or installed within the carrier vehicle 110 can drive by (i.e., next to or in a lane lateral to) or behind the potentially offending vehicle 122 driving in the restricted lane 140. For example, the carrier vehicle 110 can be driving in a bus lane impeded by the potentially offending vehicle 122. Alternatively, the carrier vehicle 110 can be driving in a lane adjacent to or two or more lanes lateral to the restricted lane 140. The carrier vehicle 110 can encounter the potentially offending vehicle 122 while traversing its daily route (e.g., bus route, garbage collection route, patrol route, etc.).

The edge device 102 can capture videos of the potentially offending vehicle 122 and at least part of the restricted lane 140 using the event camera 114 (and, in some instances, the LPR camera 116). For example, the videos can be in the MPEG-4 or MP4 file format.

In some embodiments, the videos can refer to multiple videos captured by the event camera 114, the LPR camera 116, or a combination thereof. In other embodiments, the videos can refer to one compiled video comprising multiple videos captured by the event camera 114, the LPR camera 116, or a combination thereof.

Each edge device 102 can be configured to continuously take videos of its surrounding environment (i.e., an environment outside of the carrier vehicle 110) as the carrier vehicle 110 traverses its usual carrier route.

As will be discussed in more detail in later sections, one or more processors of the control unit 112 can also be programmed to automatically identify objects from the videos by applying a plurality of functions from a computer vision library 306 (see, e.g., FIG. 3) to the videos to, among other things, read video frames from the videos and pass at least some of the video frames (e.g., the event video frames 124 and/or the license plate video frames 126) to a plurality of deep learning models running on the control unit 112. For example, the potentially offending vehicle 122 and the restricted lane 140 (e.g., bus lane or bike lane) can be identified as part of this detection step.

One or more processors of the control unit 112 can then determine a trajectory of the potentially offending vehicle 122 in an image space of the video frames. As will be discussed in more detail in later sections, one or more processors of the control unit 112 can then transform the trajectory of the potentially offending vehicle 122 in the image space of the video frames into a trajectory of the potentially offending vehicle 122 in a GPS space (i.e., the trajectory of the potentially offending vehicle 122 as represented by GPS coordinates in latitude and longitude). The trajectory of the potentially offending vehicle 122 in the GPS space can then be provided as an input to a vehicle movement classifier 313 (see, e.g., FIGS. 3, 9, and 10). The vehicle movement classifier 313 can generate as an output a plurality of movement class predictions 902 and a class confidence score 904 associated with each of the movement class predictions 902 (see, e.g., FIG. 9).

Each of the class confidence scores 904 can be evaluated or compared against a predetermined threshold based on the movement class prediction 902 to determine whether the vehicle was moving when located in the restricted lane 140 (e.g., bus lane or bike lane).

In some embodiments, the highest class confidence score 904 amongst all of the class confidence scores 904 outputted by the vehicle movement classifier 313 can be evaluated or compared against a predetermined threshold based on the movement class prediction 902 to determine whether the vehicle was moving when located in the restricted lane 140 (e.g., bus lane or bike lane).

In alternative embodiments, determining the trajectory of the potentially offending vehicle 122 in the image space and in the GPS space can be done by the server 104. In these embodiments, the trajectory of the potentially offending vehicle 122 in the GPS space can be provided as an input to a vehicle movement classifier 313 running on the server 104 (see, e.g., FIG. 3). The vehicle movement classifier 313 running on the server 104 can generate as an output a plurality of movement class predictions 902 and a class confidence score 904 associated with each of the movement class predictions 902 (see, e.g., FIG. 9). In these embodiments, each of the class confidence scores 904 or the highest class confidence score 940 can then be evaluated against a predetermined threshold based on the movement class prediction 902 to determine whether the vehicle was moving when located in the restricted lane 140 (e.g., bus lane or bike lane). In these embodiments, the one or more processors of the control unit 112 can transmit one or more evidence packages 136 comprising video frames from videos captured by the edge device 102 and data/information concerning the potentially offending vehicle 122 to the server 104.

As will be discussed in more detail in later sections, the trajectory of the potentially offending vehicle 122 can be determined or calculated using, in part, a positioning data (e.g., GPS data) obtained from the communication and positioning unit 118, inertial measurement data obtained from an IMU, and/or wheel odometry data obtained from a wheel odometer of the carrier vehicle 110 via the vehicle bus connector 120.

The one or more processors of the control unit 112 can also pass at least some of the video frames (e.g., the event video frames 124, the license plate video frames 126, or a combination thereof) to one or more deep learning models running on the control unit 112 to identify a set of vehicle attributes 134 of the potentially offending vehicle 122. The set of vehicle attributes 134 can include a color of the potentially offending vehicle 122, a make and model of the potentially offending vehicle 122 and a vehicle type of the potentially offending vehicle 122 (e.g., whether the potentially offending vehicle 122 is a personal vehicle or a public service vehicle such as a fire truck, ambulance, parking enforcement vehicle, police car, etc. that is exempt from certain traffic laws).

The one or more processors of the control unit 112 can also pass the license plate video frames 126 captured by the LPR camera 116 to a license plate recognition engine 304 and a license plate recognition deep learning model 310 (see, e.g., FIG. 3) running on the control unit 112 to recognize an alphanumeric string representing a license plate number 128 of the license plate 129 of the potentially offending vehicle 122.

The control unit 112 of the edge device 102 can also wirelessly transmit one or more evidence packages 136 comprising at least some of the event video frames 126 and the license plate video frames 126, the location 130 of the potentially offending vehicle 122, one or more timestamps 132, the recognized vehicle attributes 134, and the extracted license plate number 128 of the potentially offending vehicle 122 to the server 104.

Figure 1C:
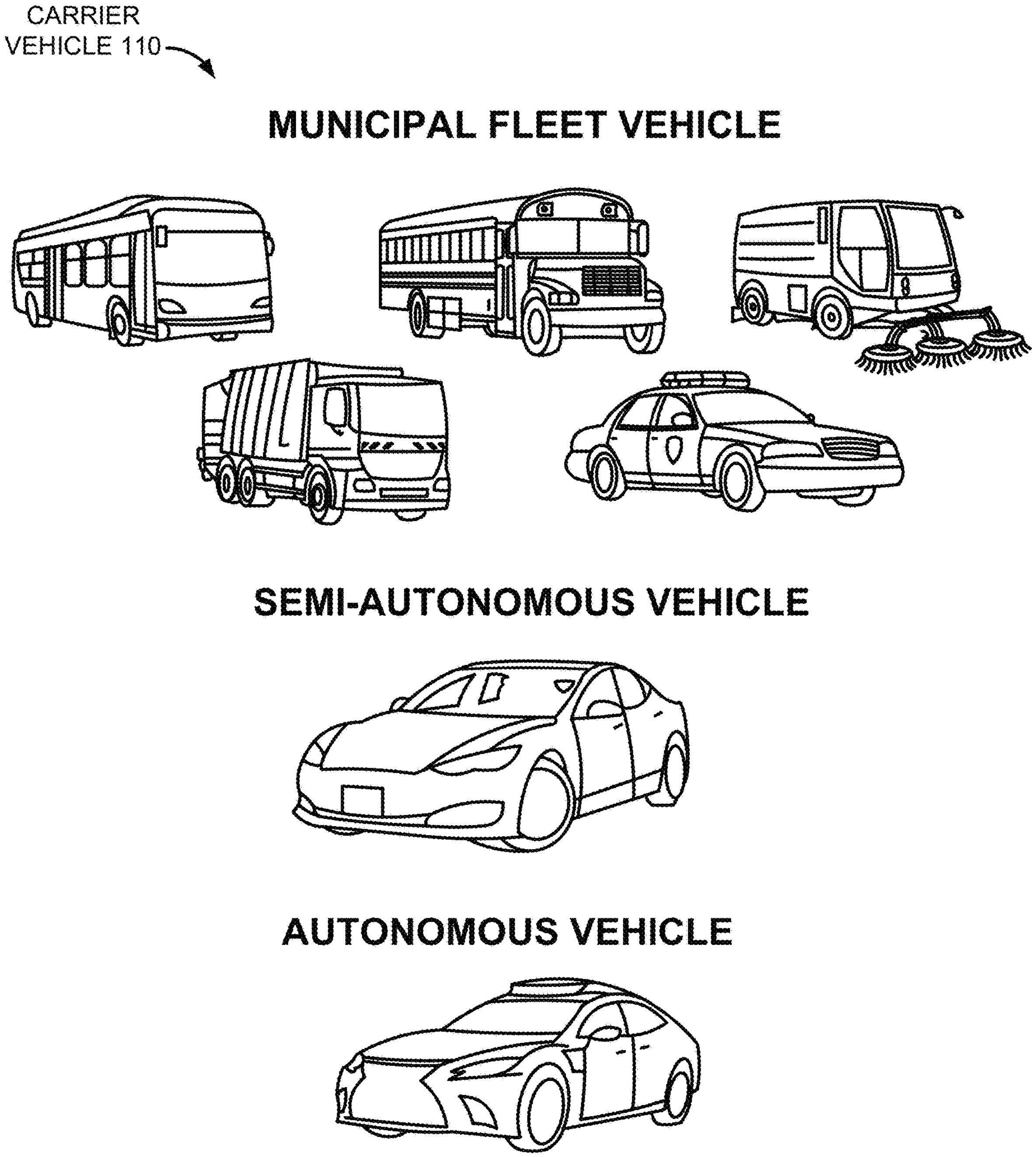
FIG. 1C illustrates different examples of carrier vehicles that can be used to carry the edge device.

FIG. 1C illustrates that, in some embodiments, the carrier vehicle 110 can be a municipal fleet vehicle. For example, the carrier vehicle 110 can be a transit vehicle such as a municipal bus, train, or light-rail vehicle, a school bus, a street sweeper, a sanitation vehicle (e.g., a garbage truck or recycling truck), a traffic or parking enforcement vehicle, or a law enforcement vehicle (e.g., a police car or highway patrol car), a tram or light-rail train.

In other embodiments, the carrier vehicle 110 can be a semi-autonomous vehicle such as a vehicle operating in one or more self-driving modes with a human operator in the vehicle. In further embodiments, the carrier vehicle 110 can be an autonomous vehicle or self-driving vehicle.

In certain embodiments, the carrier vehicle 110 can be a private vehicle or vehicle not associated with a municipality or government entity.

In alternative embodiments, the edge device 102 can be carried by or otherwise coupled to a micro-mobility vehicle (e.g., an electric scooter). In other embodiments contemplated by this disclosure, the edge device 102 can be carried by or otherwise coupled to an unmanned aerial vehicle (UAV) or drone.

Figure 2A:
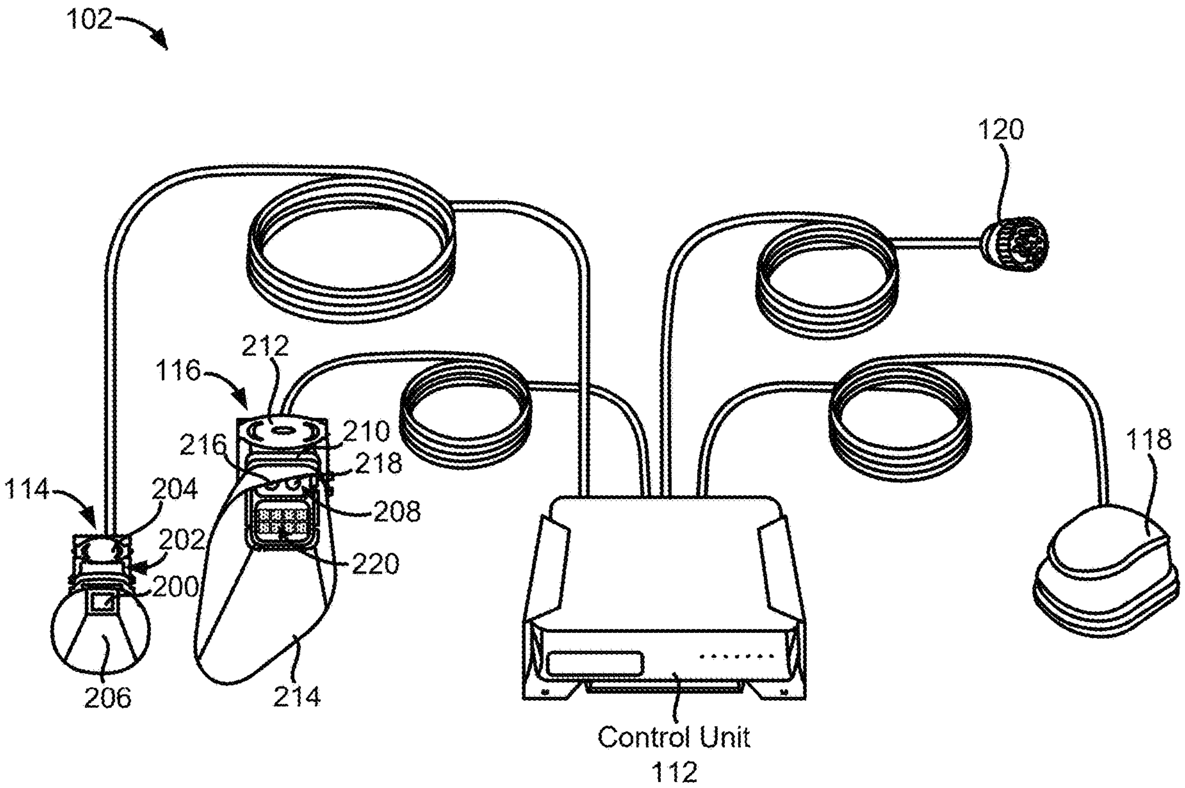
FIG. 2A illustrates one embodiment of an edge device of the system.

FIG. 2A illustrates one embodiment of an edge device 102 of the system 100. For purposes of this disclosure, any references to the edge device 102 can also be interpreted as a reference to a specific component, processor, module, chip, or circuitry within the edge device 102. The edge device 102 can be configured for placement behind a windshield of a carrier vehicle 110 (e.g., a fleet vehicle, see FIG. 1C).

As shown in FIG. 2A, the edge device 102 can comprise a control unit 112, an event camera 114 communicatively coupled to the control unit 112, and one or more license plate recognition (LPR) camera cameras 116 communicatively coupled to the control unit 112. The edge device 102 can further comprise a communication and positioning unit 118 and a vehicle bus connector 120. The event camera 114 and the LPR camera 116 can be connected or communicatively coupled to the control unit 112 via high-speed camera interfaces such as a Mobile Industry Processor Interface (MIPI) camera serial interface.

The control unit 112 can comprise one or more processors, memory and storage units, and inertial measurement units (IMUs). The event camera 114 and the LPR camera 116 can be coupled to the control unit 112 via high-speed buses, communication cables or wires, and/or other types of wired or wireless interfaces. The components within each of the control unit 112, the event camera 114, or the LPR camera 116 can also be connected to one another via high-speed buses, communication cables or wires, and/or other types of wired or wireless interfaces.

The one or more processors of the control unit 112 can include one or more central processing units (CPUs), graphics processing units (GPUs), Application-Specific Integrated Circuits (ASICs), field-programmable gate arrays (FPGAs), tensor processing units (TPUs), or a combination thereof. The one or more processors can execute software stored in the memory and storage units to execute the methods or instructions described herein.

For example, the one or more processors can refer to one or more GPUs and CPUs of a processor module configured to perform operations or undertake calculations. As a more specific example, the processors can perform operations or undertake calculations at a terascale. In some embodiments, the one or more processors of the control unit 112 can be configured to perform operations at 21 teraflops (TFLOPS).

The one or more processors of the control unit 112 can be configured to run multiple deep learning models or neural networks in parallel and process data received from the event camera 114, the LPR camera 116, or a combination thereof. More specifically, the processor module can be a Jetson Xavier NX™ module developed by NVIDIA Corporation. The one or more processors can comprise one or more GPUs having a plurality of processing cores (e.g., between 300 and 400 processing cores) and tensor cores, at least one CPU (e.g., at least one 64-bit CPU having multiple processing cores), and a deep learning accelerator (DLA) or other specially designed circuitry optimized for deep learning algorithms (e.g., an NVDLA™ engine developed by NVIDIA Corporation).

In some embodiments, at least part of the GPU's processing power can be utilized for object detection and license plate recognition. In these embodiments, at least part of the DLA's processing power can be utilized for object detection and lane line detection. Moreover, at least part of the CPU's processing power can be used for lane line detection and simultaneous localization and mapping. The CPU's processing power can also be used to run other functions and maintain the operation of the edge device 102.

The memory and storage units can comprise volatile memory and non-volatile memory or storage. For example, the memory and storage units can comprise flash memory or storage such as one or more solid-state drives, dynamic random access memory (DRAM) or synchronous dynamic random access memory (SDRAM) such as low-power double data rate (LPDDR) SDRAM, and embedded multimedia controller (eMMC) storage. For example, the memory and storage units can comprise a 512 gigabyte (GB) SSD, an 8 GB 128-bit LPDDR4× memory, and 16 GB eMMC 5.1 storage device. The memory and storage units can store software, firmware, data (including video and image data), tables, logs, databases, or a combination thereof.

Each of the IMUs can comprise a 3-axis accelerometer and a 3-axis gyroscope. For example, the 3-axis accelerometer can be a 3-axis microelectromechanical system (MEMS) accelerometer and a 3-axis MEMS gyroscope. As a more specific example, the IMUs can be a low-power 6-axis IMU provided by Bosch Sensortec GmbH.

For purposes of this disclosure, any references to the edge device 102 can also be interpreted as a reference to a specific component, processor, module, chip, or circuitry within a component of the edge device 102.

The communication and positioning unit 118 can comprise at least one of a cellular communication module, a WiFi communication module, a Bluetooth® communication module, and a high-precision automotive-grade positioning unit.

For example, the cellular communication module can support communications over a 5G network or a 4G network (e.g., a 4G long-term evolution (LTE) network) with automatic fallback to 3G networks. The cellular communication module can comprise a number of embedded SIM cards or embedded universal integrated circuit cards (eUICCs) allowing the device operator to change cellular service providers over-the-air without needing to physically change the embedded SIM cards. As a more specific example, the cellular communication module can be a 4G LTE Cat-12 cellular module.

The WiFi communication module can allow the control unit 112 to communicate over a WiFi network such as a WiFi network provided by a carrier vehicle 110, a municipality, a business, or a combination thereof. The WiFi communication module can allow the control unit 112 to communicate over one or more WiFi (IEEE 802.11) communication protocols such as the 802.11n, 802.11ac, or 802.11ax protocol.

The Bluetooth® module can allow the control unit 112 to communicate with other control units on other carrier vehicles over a Bluetooth® communication protocol (e.g., Bluetooth® basic rate/enhanced data rate (BR/EDR), a Bluetooth® low energy (BLE) communication protocol, or a combination thereof). The Bluetooth® module can support a Bluetooth® v4.2 standard or a Bluetooth v5.0 standard. In some embodiments, the wireless communication modules can comprise a combined WiFi and Bluetooth® module.

The communication and positioning unit 118 can comprise a multi-band global navigation satellite system (GNSS) receiver configured to concurrently receive signals from a GPS satellite navigation system, a GLONASS satellite navigation system, a Galileo navigation system, and a BeiDou satellite navigation system. For example, the communication and positioning unit 118 can comprise a multi-band GNSS receiver configured to concurrently receive signals from at least two satellite navigation systems including the GPS satellite navigation system, the GLONASS satellite navigation system, the Galileo navigation system, and the BeiDou satellite navigation system. In other embodiments, the communication and positioning unit 118 can be configured to receive signals from all four of the aforementioned satellite navigation systems or three out of the four satellite navigation systems. For example, the communication and positioning unit 118 can comprise a ZED-F9K dead reckoning module provided by u-blox holding AG.

The communication and positioning unit 118 can provide positioning data that can allow the edge device 102 to determine its own location at a centimeter-level accuracy. The communication and positioning unit 118 can also provide positioning data that can be used by the control unit 112 of the edge device 102 to determine the location 130 of the potentially offending vehicle 122. For example, the control unit 112 can use positioning data concerning its own location to estimate or calculate the location 130 of the potentially offending vehicle 122.

FIG. 2A also illustrates that the edge device 102 can comprise a vehicle bus connector 120 coupled to the control unit 112. The vehicle bus connector 120 can allow the control unit 112 to obtain wheel odometry data from a wheel odometer of a carrier vehicle 110 carrying the edge device 102. For example, the vehicle bus connector 120 can be a J1939 connector. The control unit 112 can take into account the wheel odometry data to determine the location of the potentially offending vehicle 122.

The edge device 102 can also comprise a power management integrated circuit (PMIC). The PMIC can be used to manage power from a power source. In some embodiments, the components of the edge device 102 can be powered by a portable power source such as a battery. In other embodiments, one or more components of the edge device 102 can be powered via a physical connection (e.g., a power cord) to a power outlet or direct-current (DC) auxiliary power outlet (e.g., 12V/24V) of a carrier vehicle 110 carrying the edge device 102.

The event camera 114 can comprise an event camera image sensor 200 contained within an event camera housing 202, an event camera mount 204 coupled to the event camera housing 202, and an event camera skirt 206 coupled to and protruding outwardly from a front face or front side of the event camera housing 202.

The event camera housing 202 can be made of a metallic material (e.g., aluminum), a polymeric material, or a combination thereof. The event camera mount 204 can be coupled to the lateral sides of the event camera housing 202. The event camera mount 204 can comprise a mount rack or mount plate positioned vertically above the event camera housing 202. The mount rack or mount plate of the event camera mount 204 can allow the event camera 114 to be mounted or otherwise coupled to a ceiling and/or headliner of the carrier vehicle 110. The event camera mount 204 can allow the event camera housing 202 to be mounted in such a way that a camera lens of the event camera 114 faces the windshield of the carrier vehicle 110 or is positioned substantially parallel with the windshield. This can allow the event camera 114 to take videos of an environment outside of the carrier vehicle 110 including vehicles driving near the carrier vehicle 110. The event camera mount 204 can also allow an installer to adjust a pitch/tilt and/or swivel/yaw of the event camera housing 202 to account for a tilt or curvature of the windshield.

The event camera skirt 206 can block or reduce light emanating from an interior of the carrier vehicle 110 to prevent such light from interfering with the videos captured by the event camera image sensor 200. For example, when the carrier vehicle 110 is a municipal bus, the interior of the municipal bus is often lit by artificial lights (e.g., fluorescent lights, LED lights, etc.) to ensure passenger safety. The event camera skirt 206 can block or reduce the amount of artificial light that reaches the event camera image sensor 200 to prevent this light from degrading the videos captured by the event camera image sensor 200. The event camera skirt 206 can be designed to have a tapered or narrowed end and a wide flared end. The tapered end of the event camera skirt 206 can be coupled to a front portion or front face/side of the event camera housing 202. The event camera skirt 206 can also comprise a skirt distal edge defining the wide flared end. In some embodiments, the event camera 114 can be mounted or otherwise coupled in such a way that the skirt distal edge of the event camera skirt 206 is separated from the windshield of the carrier vehicle 110 by a separation distance. In some embodiments, the separation distance can be between about 1.0 cm and 10.0 cm.

In some embodiments, the event camera skirt 206 can be made of a dark-colored non-transparent polymeric material. In certain embodiments, the event camera skirt 206 can be made of a non-reflective material. As a more specific example, the event camera skirt 206 can be made of a dark-colored thermoplastic elastomer such as thermoplastic polyurethane (TPU).

The event camera image sensor 200 can be configured to capture video at a frame rate of between 15 frames per second and up to 60 frames per second (FPS). For example, the event camera image sensor 200 can be a high-dynamic range (HDR) image sensor. The event camera image sensor 200 can capture video images at a minimum resolution of 1920×1080 (or 2 megapixels). As a more specific example, the event camera image sensor 200 can comprise one or more CMOS image sensors provided by OMNIVISION Technologies, Inc.

In some embodiments, the event camera image sensor 200 can be an RGB-IR image sensor.

As previously discussed, the event camera 114 can capture videos of an environment outside of the carrier vehicle 110, including any vehicles driving near the carrier vehicle 110, as the carrier vehicle 110 traverses its usual carrier route. The control unit 112 can be programmed to apply a plurality of functions from a computer vision library to the videos to read event video frames 124 from the videos and pass the event video frames 124 to a plurality of deep learning models (e.g., neural networks) running on the control unit 112 to automatically identify objects (e.g., cars, trucks, buses, etc.) and roadways (e.g., a roadway encompassing the restricted lane 140) from the event video frames 124 in order to determine whether a bus lane moving violation has occurred.

As shown in FIG. 2A, the edge device 102 can also comprise an LPR camera 116. The LPR camera 116 can comprise at least two LPR image sensors 208 contained within an LPR camera housing 210, an LPR camera mount 212, coupled to the LPR camera housing 210, and an LPR camera skirt 214 coupled to and protruding outwardly from a front face or front side of the LPR camera housing 210.

The LPR camera housing 210 can be made of a metallic material (e.g., aluminum), a polymeric material, or a combination thereof. The LPR camera mount 212 can be coupled to the lateral sides of the LPR camera housing 210. The LPR camera mount 212 can comprise a mount rack or mount plate positioned vertically above the LPR camera housing 210. The mount rack or mount plate of the LPR camera mount 212 can allow the LPR camera 116 to be mounted or otherwise coupled to a ceiling and/or headliner of the carrier vehicle 110. The LPR camera mount 212 can also allow an installer to adjust a pitch/tilt and/or swivel/yaw of the LPR camera housing 210 to account for a tilt or curvature of the windshield.

The LPR camera mount 212 can allow the LPR camera housing 210 to be mounted in such a way that the LPR camera 116 faces the windshield of the carrier vehicle 110 at an angle. This can allow the LPR camera 116 to capture videos of license plates of vehicles directly in front of or on one side (e.g., a right side or left side) of the carrier vehicle 110.

The LPR camera 116 can comprise a daytime image sensor 216 and a nighttime image sensor 218. The daytime image sensor 216 can be configured to capture images or videos in the daytime or when sunlight is present. Moreover, the daytime image sensor 216 can be an image sensor configured to capture images or videos in the visible spectrum.

The nighttime image sensor 218 can be an infrared (IR) or near-infrared (NIR) image sensor configured to capture images or videos in low-light conditions or at nighttime.

In certain embodiments, the daytime image sensor 216 can comprise a CMOS image sensor manufactured or distributed by OmniVision Technologies, Inc. For example, the daytime image sensor 216 can be the OmniVision OV2311 CMOS image sensor configured to capture videos between 15 FPS and 60 FPS.

The nighttime image sensor 218 can comprise an IR or NIR image sensor manufactured or distributed by OmniVision Technologies, Inc.

In other embodiments not shown in the figures, the LPR camera 116 can comprise one image sensor with both daytime and nighttime capture capabilities. For example, the LPR camera 116 can comprise one RGB-IR image sensor.

The LPR camera can also comprise a plurality of IR or NIR light-emitting diodes (LEDs) 220 configured to emit IR or NIR light to illuminate an event scene in low-light or nighttime conditions. In some embodiments, the IR/NIR LEDs 220 can be arranged as an IR/NIR light array (see FIG. 2A).

The IR LEDs 220 can emit light in the infrared or near-infrared (NIR) range (e.g., about 800 nm to about 1400 nm) and act as an IR or NIR spotlight to illuminate a nighttime environment or low-light environment immediately outside of the carrier vehicle 110. In some embodiments, the IR LEDs 220 can be arranged as a circle or in a pattern surrounding or partially surrounding the nighttime image sensor 218. In other embodiments, the IR LEDs 220 can be arranged in a rectangular pattern, an oval pattern, and/or a triangular pattern around the nighttime image sensor 218.

In additional embodiments, the LPR camera 116 can comprise a nighttime image sensor 218 (e.g., an IR or NIR image sensor) positioned in between two IR LEDs 220. In these embodiments, one IR LED 220 can be positioned on one lateral side of the nighttime image sensor 218 and the other IR LED 220 can be positioned on the other lateral side of the nighttime image sensor 218.

In certain embodiments, the LPR camera 116 can comprise between 3 and 12 IR LEDs 220. In other embodiments, the LPR camera 116 can comprise between 12 and 20 IR LEDs.

In some embodiments, the IR LEDs 220 can be covered by an IR bandpass filter. The IR bandpass filter can allow only radiation in the IR range or NIR range (between about 780 nm to about 1500 nm) to pass while blocking light in the visible spectrum (between about 380 nm to about 700 nm). In some embodiments, the IR bandpass filter can be an optical-grade polymer-based filter or a piece of high-quality polished glass. For example, the IR bandpass filter can be made of an acrylic material (optical-grade acrylic) such as an infrared transmitting acrylic sheet. As a more specific example, the IR bandpass filter can be a piece of poly (methyl methacrylate) (PMMA) (e.g., Plexiglass™) that covers the IR LEDs 220.

In some embodiments, the LPR camera skirt 214 can be made of a dark-colored non-transparent polymeric material. In certain embodiments, the LPR camera skirt 214 can be made of a polymeric material. For example, the LPR camera skirt 214 can be made of a non-reflective material. As a more specific example, the LPR camera skirt 214 can be made of a dark-colored thermoplastic elastomer such as thermoplastic polyurethane (TPU).

Although FIG. 2A illustrates an embodiment of the LPR camera 116 with only one LPR camera skirt 214, it is contemplated by this disclosure that the LPR camera 116 can comprise an outer LPR camera skirt and an inner LPR camera skirt. The inner LPR camera skirt can block IR light reflected by the windshield of the carrier vehicle 110 that can interfere with the videos captured by the nighttime image sensor 218.

The LPR camera skirt 214 can comprise a first skirt lateral side, a second skirt lateral side, a skirt upper side, and a skirt lower side. The first skirt lateral side can have a first skirt lateral side length. The second skirt lateral side can have a second skirt lateral side length. In some embodiments, the first skirt lateral side length can be greater than the second skirt lateral side length such that the first skirt lateral side protrudes out further than the second skirt lateral side. In these and other embodiments, any of the first skirt lateral side length or the second skirt lateral side length can vary along a width of the first skirt lateral side or along a width of the second skirt lateral side, respectively. However, in all such embodiments, a maximum length or height of the first skirt lateral side is greater than a maximum length or height of the second skirt lateral side. In further embodiments, a minimum length or height of the first skirt lateral side is greater than a minimum length or height of the second skirt lateral side. The skirt upper side can have a skirt upper side length or a skirt upper side height. The skirt lower side can have a skirt lower side length or a skirt lower side height. In some embodiments, the skirt lower side length or skirt lower side height can be greater than the skirt upper side length or the skirt upper side height such that the skirt lower side protrudes out further than the skirt upper side. The unique design of the LPR camera skirt 214 can allow the LPR camera 116 to be positioned at an angle with respect to a windshield of the carrier vehicle 110 but still allow the LPR camera skirt 214 to block light emanating from an interior of the carrier vehicle 110 or block light from interfering with the image sensors of the LPR camera 116.

The LPR camera 116 can capture videos of license plates of vehicles driving near the carrier vehicle 110 as the carrier vehicle 110 traverses its usual carrier route. The control unit 112 can be programmed to apply a plurality of functions from a computer vision library to the videos to read license plate video frames 126 from the videos and pass the license plate video frames 126 to a license plate recognition deep learning model running on the control unit 112 to automatically extract license plate numbers 128 from such license plate video frames 126. For example, the control unit 112 can pass the license plate video frames 126 to the license plate recognition deep learning model running on the control unit 112 to extract license plate numbers of all vehicles detected by an object detection deep learning model running on the control unit 112.

Figure 3:
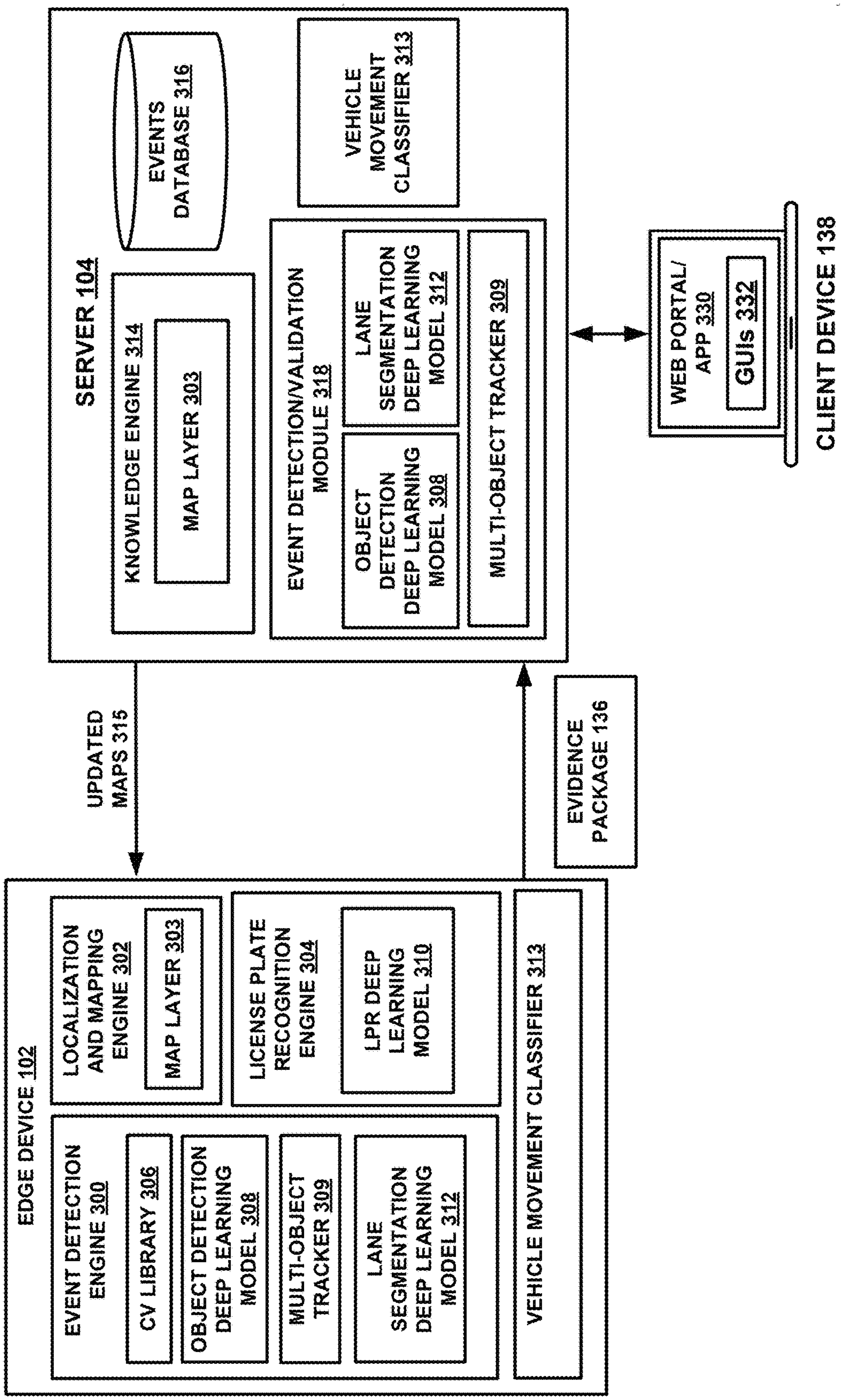
FIG. 3 illustrates various modules and engines of one embodiment of the edge device and one embodiment of the server.

The control unit 112 can also pass the event video frames 124 to a plurality of deep learning models running on the edge device 102 (see FIG. 3).

The control unit 112 can include the automatically recognized license plate number 128 of the license plate 129 of the potentially offending vehicle 122 in the evidence package 136 transmitted to the server 104.

As will be discussed in more detail with respect to FIG. 3, in some embodiments, once the server 104 has received the evidence package 136, the one or more processors of the server 104 can be programmed to pass the event video frames 124 and the license plate video frames 126 to a plurality of deep learning models running on the server 104. The deep learning models (e.g., neural networks) running on the server 104 can then output its own predictions or classifications to determine whether the potentially offending vehicle 122 has committed a bus lane moving violation or to validate the determination(s) made by the edge device (s) 102.

Figure 2B:
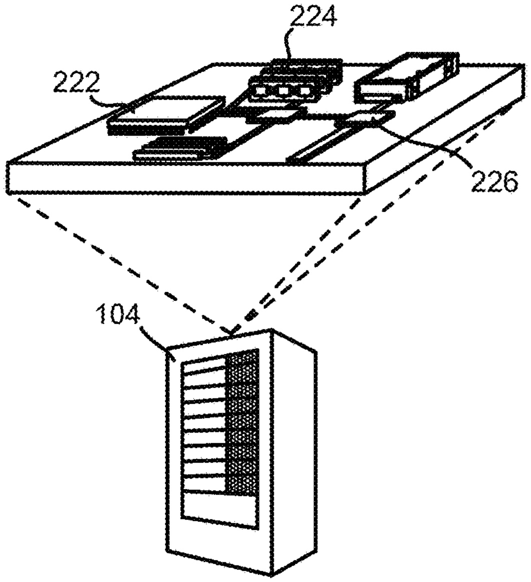
FIG. 2B illustrates one embodiment of a server of the system.

FIG. 2B illustrates one embodiment of the server 104 of the system 100. As previously discussed, the server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more physical servers or dedicated computing resources or nodes such as a rack-mounted server, a blade server, a mainframe, a dedicated desktop or laptop computer, one or more processors or processors cores therein, or a combination thereof.

For purposes of the present disclosure, any references to the server 104 can also be interpreted as a reference to a specific component, processor, module, chip, or circuitry within the server 104.

For example, the server 104 can comprise one or more server processors 222, server memory and storage units 224, and a server communication interface 226. The server processors 222 can be coupled to the server memory and storage units 224 and the server communication interface 226 through high-speed buses or interfaces.

The one or more server processors 222 can comprise one or more CPUs, GPUs, ASICS, FPGAs, TPUs, or a combination thereof. The one or more server processors 222 can execute software stored in the server memory and storage units 224 to execute the methods or instructions described herein. The one or more server processors 222 can be embedded processors, processor cores, microprocessors, logic circuits, hardware FSMs, DSPs, or a combination thereof. As a more specific example, at least one of the server processors 222 can be a 64-bit processor.

The server memory and storage units 224 can store software, data (including video or image data), tables, logs, databases, or a combination thereof. The server memory and storage units 224 can comprise an internal memory and/or an external memory, such as a memory residing on a storage node or a storage server. The server memory and storage units 224 can be a volatile memory or a non-volatile memory. For example, the server memory and storage units 224 can comprise nonvolatile storage such as NVRAM, Flash memory, solid-state drives, hard disk drives, and volatile storage such as SRAM, DRAM, or SDRAM.

The server communication interface 226 can refer to one or more wired and/or wireless communication interfaces or modules. For example, the server communication interface 226 can be a network interface card. The server communication interface 226 can comprise or refer to at least one of a WiFi communication module, a cellular communication module (e.g., a 4G or 5G cellular communication module), and a Bluetooth®/BLE or other type of short-range communication module. The server 104 can connect to or communicatively couple with each of the edge devices 102 via the server communication interface 226. The server 104 can transmit or receive packets of data using the server communication interface 226.

Figure 2C:
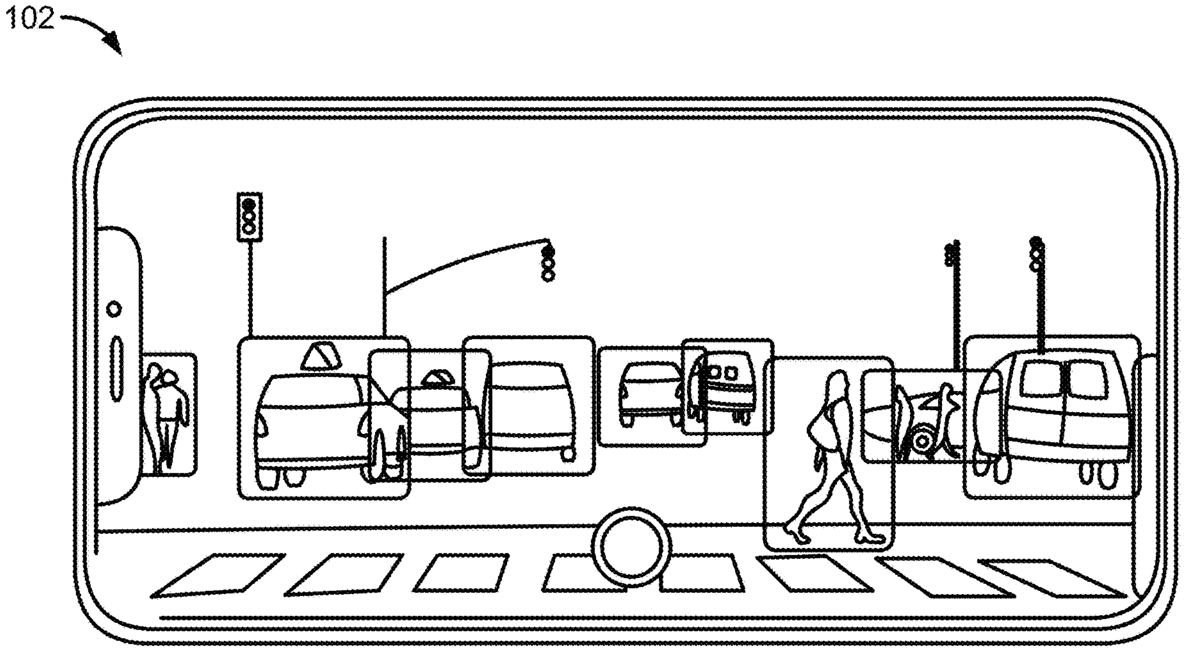
FIG. 2C illustrates another embodiment of the edge device as a personal communication device.

FIG. 2C illustrates an alternative embodiment of the edge device 102 where the edge device 102 is a personal communication device such as a smartphone or tablet computer. In this embodiment, the event camera 114 and the LPR camera 116 of the edge device 102 can be the built-in cameras or image sensors of the smartphone or tablet computer. Moreover, references to the one or more processors, the memory and storage units, the communication and positioning unit 118, and the IMUs of the edge device 102 can refer to the same or similar components within the smartphone or tablet computer.

Also, in this embodiment, the smartphone or tablet computer serving as the edge device 102 can also wirelessly communicate or be communicatively coupled to the server 104 via the secure connection 108. The smartphone or tablet computer can also be positioned near a windshield or window of a carrier vehicle 110 via a phone or tablet holder coupled to the ceiling/headliner, windshield, window, console, and/or dashboard of the carrier vehicle 110.

FIG. 3 illustrates certain modules and engines of one embodiment of the edge device 102 and the server 104. In some embodiments, the edge device 102 can comprise at least an event detection engine 300 or module, a localization and mapping engine 302 or module, a license plate recognition engine 304 or module, and a vehicle movement classifier 313.

Software instructions run on the edge device 102, including any of the engines and modules disclosed herein, can be written in the Java® programming language, C++ programming language, the Python® programming language, the Golang™ programming language, or a combination thereof.

As previously discussed, the edge device 102 can continuously capture videos of an external environment surrounding the edge device 102. For example, the event camera 114 and the LPR camera 116 (see FIG. 2A) of the edge device 102 can capture everything that is within a field of view of the cameras.

In some embodiments, the event camera 114 can capture videos comprising a plurality of event video frames 124 and the LPR camera 116 can capture videos comprising a plurality of license plate video frames 126.

In alternative embodiments, the event camera 114 can also capture videos of license plates that can be used as license plate video frames 126. Moreover, the LPR camera 116 can capture videos of a bus lane moving violation event that can be used as event video frames 124.

The edge device 102 can retrieve or grab the event video frames 124, the license plate video frames 126, or a combination thereof from a shared camera memory. The shared camera memory can be an onboard memory (e.g., non-volatile memory) of the edge device 102 for storing video frames captured by the event camera 114, the LPR camera 116, or a combination thereof. Since the event camera 114 and the LPR camera 116 are capturing videos at approximately 20 to 60 video frames per second (FPS), the video frames are stored in the shared camera memory prior to being analyzed by the event detection engine 300. In some embodiments, the video frames can be grabbed using a video frame grab function such as the GStreamer tool.

The event detection engine 300 can call a plurality of functions from a computer vision library 306 to enhance one or more video frames by resizing, cropping, or rotating the one or more video frames. For example, the event detection engine 300 can crop and resize the one or more video frames to optimize the one or more video frames for analysis by one or more deep learning models or neural networks running on the edge device 102.

For example, the event detection engine 300 can crop and resize at least one of the video frames to produce a cropped and resized video frame that meets certain size parameters associated with the deep learning models running on the edge device 102. Also, for example, the event detection engine 300 can crop and resize the one or more video frames such that the aspect ratio of the one or more video frames meets parameters associated with the deep learning models running on the edge device 102.

In some embodiments, the computer vision library 306 can be the OpenCV® library maintained and operated by the Open Source Vision Foundation. In other embodiments, the computer vision library 306 can be or comprise functions from the TensorFlow® software library, the SimpleCV® library, or a combination thereof.

The event detection engine 300 can pass or feed at least some of the event video frames 124 to an object detection deep learning model 308 (e.g., a neural network trained for object detection) running on the edge device 102. By passing and feeding the event video frames 124 to the object detection deep learning model 308, the event detection engine 300 can obtain as outputs from the object detection deep learning model 308 predictions, scores, or probabilities concerning the objects detected from the event video frames 124. For example, the event detection engine 300 can obtain as outputs a confidence score for each of the object classes detected.

In some embodiments, the object detection deep learning model 308 can be configured or trained such that only certain vehicle-related objects are supported by the object detection deep learning model 308. For example, the object detection deep learning model 308 can be configured or trained such that the object classes supported only include cars, trucks, buses, etc. Also, for example, the object detection deep learning model 308 can be configured or trained such that the object classes supported also include bicycles, scooters, and other types of wheeled mobility vehicles. In some embodiments, the object detection deep learning model 308 can be configured or trained such that the object classes supported also comprise non-vehicle classes such as pedestrians, landmarks, street signs, fire hydrants, bus stops, and building façades.

Although the object detection deep learning model 308 can be configured to accommodate numerous object classes, one advantage of limiting the number of object classes is to reduce the computational load on the processors of the edge device 102, shorten the training time of the neural network, and make the neural network more efficient.

The object detection deep learning model 308 can comprise a plurality of convolutional layers and connected layers trained for object detection (and, in particular, vehicle detection). In one embodiment, the object detection deep learning model 308 can be a convolutional neural network trained for object detection. For example, the object detection deep learning model 308 can be a variation of the Single Shot Detection (SSD) model. As a more specific example, the SSD model can comprise a MobileNet backbone as the feature extractor.

In other embodiments, the object detection deep learning model 308 can be a version of the You Only Look Once (YOLO) object detection model or the YOLO Lite object detection model.

In some embodiments, the object detection deep learning model 308 can also identify or predict certain attributes of the detected objects. For example, the object detection deep learning model 308 can identify or predict a set of attributes of an object identified as a vehicle (also referred to as vehicle attributes 134) such as the color of the vehicle, the make and model of the vehicle, and the vehicle type (e.g., whether the vehicle is a personal vehicle or a public service vehicle). The vehicle attributes 134 can be used by the event detection engine 300 to make an initial determination as to whether the vehicle shown in the video frames is subject to a municipality's bus lane moving violation rules or policies.

The object detection deep learning model 308 can be trained, at least in part, from video frames of videos captured by the edge device 102 or other edge devices 102 deployed in the same municipality or coupled to other carrier vehicles 110 in the same carrier fleet. The object detection deep learning model 308 can be trained, at least in part, from video frames of videos captured by the edge device 102 or other edge devices at an earlier point in time. Moreover, the object detection deep learning model 308 can be trained, at least in part, from video frames from one or more open-sourced training sets or datasets.

As shown in FIG. 3, the edge device 102 can also comprise a license plate recognition engine 304. The license plate recognition engine 304 can be configured to recognize license plate numbers 128 of potentially offending vehicles 122 (see, also, FIG. 5C) in the video frames. For example, the license plate recognition engine 304 can pass license plate video frames 126 captured by the dedicated LPR camera 116 of the edge device 102 to a license plate recognition (LPR) deep learning model 310 running on the edge device 102. The LPR deep learning model 310 can be specifically trained to recognize license plate numbers 128 of vehicles (e.g., the potentially offending vehicle 122) from video frames or images containing license plates 129 of such vehicles. Alternatively, or additionally, the license plate recognition engine 304 can also pass event video frames 124 to the LPR deep learning model 310 to recognize license plate numbers 128 of vehicles (e.g., the potentially offending vehicle 122) from such event video frames 124.

In some embodiments, the LPR deep learning model 310 can be a neural network trained for license plate recognition. In certain embodiments, the LPR deep learning model 310 can be a modified version of the OpenALPR™ license plate recognition model.

In other embodiments, the LPR deep learning model 310 can be a text-adapted vision transformer. For example, the LPR deep learning model 310 can be a version of the text-adapted vision transformer disclosed in U.S. Pat. No. 11,915,499, the content of which is incorporated herein by reference in its entirety.

By feeding video frames or images into the LPR deep learning model 310, the edge device 102 can obtain as an output from the LPR deep learning model 310, a prediction in the form of an alphanumeric string representing the license plate number 128 of the license plate 129.

In some embodiments, the LPR deep learning model 310 running on the edge device 102 can generate or output a confidence score associated with a prediction confidence representing the confidence or certainty of its own recognition result (i.e., indicative of or represent the confidence or certainty in the license plate recognized by the LPR deep learning model 310 from the license plate video frames 126).

The plate recognition confidence score (see, e.g., confidence score 512 in FIG. 5B) can be a number between 0 and 1.00. As previously discussed, the plate recognition confidence score can be included as part of an evidence package 136 transmitted to the server 104. The evidence package 136 can comprise the plate recognition confidence score along with the license plate number 128 predicted by the LPR deep learning model 310.

As previously discussed, the edge device 102 can also comprise a localization and mapping engine 302 comprising a map layer 303. The localization and mapping engine 302 can calculate or otherwise estimate the location 130 of the potentially offending vehicle 122 based in part on the present location of the edge device 102 obtained from at least one of the communication and positioning unit 118 (see, e.g., FIG. 2A) of the edge device 102, inertial measurement data obtained from the IMUs of the edge device 102, and wheel odometry data obtained from the wheel odometer of the carrier vehicle 110 carrying the edge device 102.

In some embodiments, the localization and mapping engine 302 can use the present location of the edge device 102 to estimate or calculate the location 130 of the potentially offending vehicle 122. For example, the localization and mapping engine 302 can estimate the location 130 of the potentially offending vehicle 122 by calculating a distance separating the potentially offending vehicle 122 from the edge device 102 and adding such a separation distance to its own present location. As a more specific example, the localization and mapping engine 302 can calculate the distance separating the potentially offending vehicle 122 from the edge device 102 using video frames showing the potentially offending vehicle 122 and an algorithm designed for distance calculation.

In additional embodiments, the localization and mapping engine 302 can determine the location 130 of the potentially offending vehicle 122 by recognizing an object or landmark (e.g., a bus stop sign) with a known geolocation associated with the object or landmark near the potentially offending vehicle 122.

The map layer 303 can comprise one or more semantic maps or semantic annotated maps. The edge device 102 can receive updates to the map layer 303 from the server 104 or receive new semantic maps or semantic annotated maps from the server 104. The map layer 303 can also comprise data and information concerning the widths of all lanes of roadways in a municipality. For example, the known or predetermined width of each of the lanes can be encoded or embedded in the map layer 303. The known or predetermined width of each of the lanes can be obtained by performing surveys or measurements of such lanes in the field or obtained from one or more publicly-available map databases or municipal/governmental databases. Such lane width data can then be associated with the relevant streets/roadways, areas/regions, or coordinates in the map layer 303.

The map layer 303 can further comprise data or information concerning a total number of lanes of certain municipal roadways and the direction-of-travel of such lanes. Such data or information can also be obtained by performing surveys or measurements of such lanes in the field or obtained from one or more publicly-available map databases or municipal/governmental databases. Such data or information can be encoded or embedded in the map layer 303 and then associated with the relevant streets/roadways, areas/regions, or coordinates in the map layer 303.

The edge device 102 can also record or generate at least a plurality of timestamps 132 marking the time when the potentially offending vehicle 122 was detected at the location 130. For example, the localization and mapping engine 302 can mark the time using a global positioning system (GPS) timestamp, a Network Time Protocol (NTP) timestamp, a local timestamp based on a local clock running on the edge device 102, or a combination thereof. The edge device 102 can record the timestamps 132 from multiple sources to ensure that such timestamps 132 are synchronized with one another in order to maintain the accuracy of such timestamps 132.

In some embodiments, the event detection engine 300 can also pass the event video frames 124 to a lane segmentation deep learning model 312 running on the edge device 102.

In some embodiments, the lane segmentation deep learning model 312 running on the edge device 102 can be a neural network or convolutional neural network trained for lane detection and segmentation. For example, the lane segmentation deep learning model 312 can be a multi-headed convolutional neural network comprising a residual neural network (e.g., a ResNet such as a ResNet34) backbone with a standard mask prediction decoder.

In certain embodiments, the lane segmentation deep learning model 312 can be trained using a dataset designed specifically for lane detection and segmentation. In other embodiments, the lane segmentation deep learning model 312 can also be trained using event video frames 124 obtained from other deployed edge devices 102.

As will be discussed in more detail in the following sections, the object detection deep learning model 308 can at least partially bound a potentially offending vehicle 122 detected within an event video frame 124 with a vehicle bounding polygon 500. In some embodiments, the vehicle bounding polygon 500 can be referred to as a vehicle bounding box. The object detection deep learning model 308 can also output image coordinates associated with the vehicle bounding polygon 500.

The image coordinates associated with the vehicle bounding polygon 500 can be compared with the image coordinates associated with one or more lane bounding polygons (see, e.g., FIG. 5C) outputted by the lane segmentation deep learning model 312. For example, the image coordinates associated with the vehicle bounding polygon 500 can be compared with the image coordinates associated with a lane-of-interest (LOI) polygon 516 (see FIG. 5C). In some embodiments, the event detection engine 300 can detect that the potentially offending vehicle 122 is within a restricted lane 140 (e.g., a bus lane or bike lane) based in part on an amount of overlap of at least part of the vehicle bounding polygon 500 and the LOI polygon 516.

In some embodiments, the vehicle bounding polygons 500 can be tracked across multiple event video frames 124. The vehicle bounding polygons 500 can be connected, associated, or tracked across multiple event video frames 124 using a vehicle tracker or a multi-object tracker 309.

In some embodiments, the multi-object tracker 309 can be a multi-object tracker included as part of the NVIDIA® DeepStream SDK. For example, the multi-object tracker 309 can be any of the NvSORT tracker, the NvDeepSORT tracker, or the NvDCF tracker.

In some embodiments, both the object detection deep learning model 308 and the multi-object tracker 309 can be run on the NVIDIA™ Jetson Xavier NX module of the control unit 112.

Figure 5A:
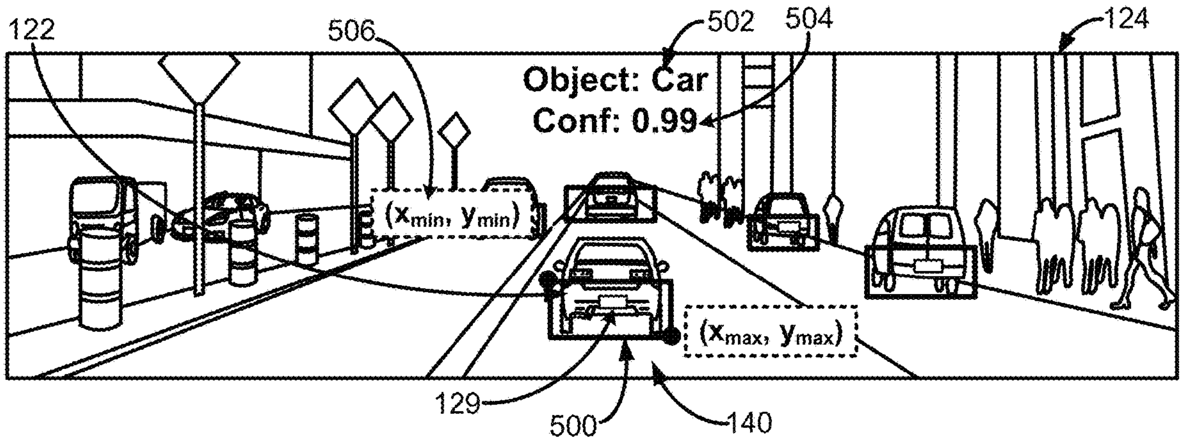
FIG. 5A illustrates an example of an event video frame captured by an event camera of an edge device.
Figure 5B:
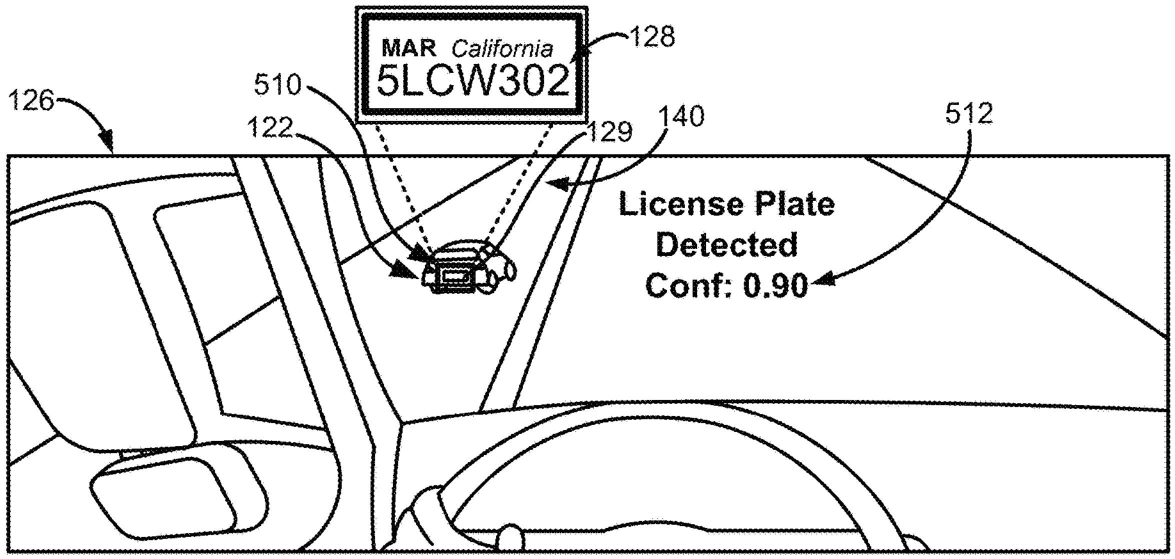
FIG. 5B illustrates an example of a license plate video frame showing a potentially offending vehicle bounded by a vehicle bounding polygon and a license plate of the potentially offending vehicle bounded by a license plate bounding polygon.
Figure 5C:
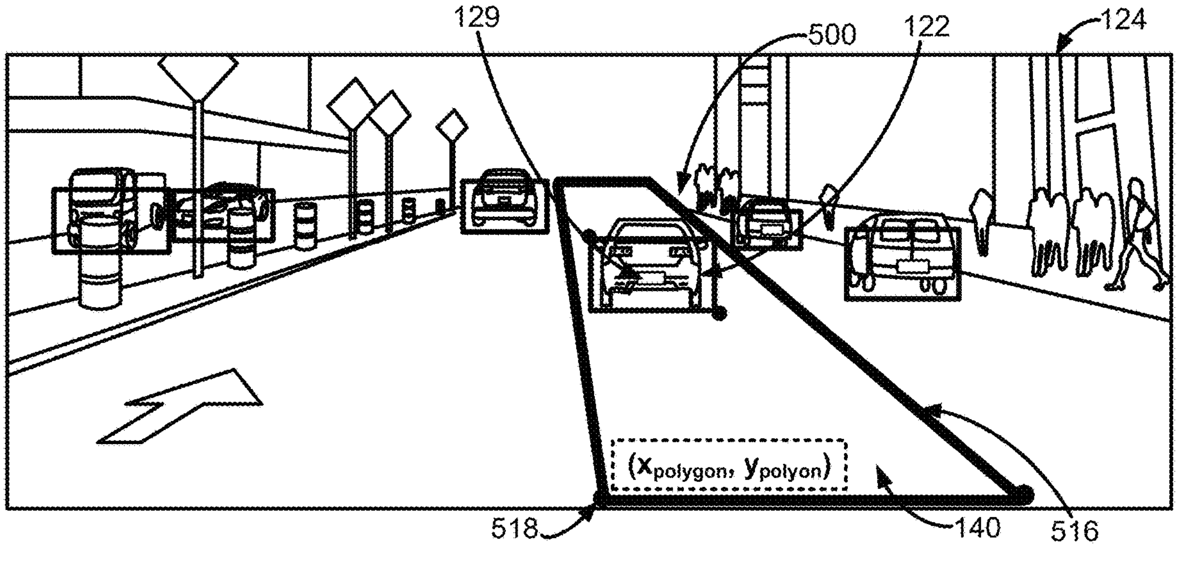
FIG. 5C illustrates another example of an event video frame showing a potentially offending vehicle bounded by a vehicle bounding polygon and a bus lane bounded by a lane bounding polygon.
Figure 7A:
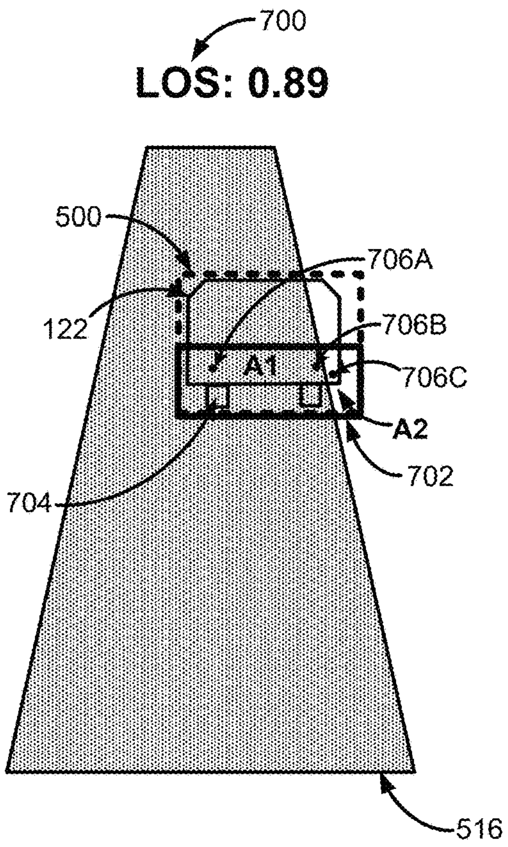
FIGS. 7A and 7B illustrate example scenarios where a lane occupancy score can be calculated.

In some embodiments, the edge device 102 can generate an evidence package 136 to be transmitted to the server 104 if the potentially offending vehicle 122 is detected within the restricted lane 140 (e.g., a bus lane or bike lane) based in part on an amount of overlap of at least part of the vehicle bounding polygon 500 and a LOI polygon 516 (see, e.g., FIGS. 5C and 7A).

In alternative embodiments, the edge device 102 can generate an evidence package 136 to be transmitted to the server 104 if the potentially offending vehicle 122 appears for more than a (configurable) number of event video frames 124 within a (configurable) period of time.

In these embodiments, the relevant event video frames 124, information concerning the vehicle tracking polygons 500, the tracking results, and certain metadata concerning the event can be included as part of the evidence package 136 to be transmitted to the server 104 for further analysis and event detection.

In some embodiments, the evidence package 136 can also comprise the license plate video frames 126, the license plate number 128 of the potentially offending vehicle 122 recognized by the edge device 102, a location of the edge device 102, a location 130 of the potentially offending vehicle 122 as calculated by the edge device 102, the speed of the carrier vehicle 110 when the potential bus lane moving violation was detected, and any timestamps 132 recorded by the control unit 112.

In some embodiments, the event detection engine 300 can first determine a trajectory of the potentially offending vehicle 122 in an image space of the event video frames 124 (i.e., a coordinate domain of the event video frames 124) and then transform the trajectory in the image space into a trajectory of the vehicle in a GPS space (i.e., using GPS coordinates in latitude and longitude). Transforming the trajectory of the potentially offending vehicle 122 from the image space into the GPS space can be done using, in part, a homography matrix 901 (see, e.g., FIG. 9). For example, the homography matrix 901 can be a camera-to-GPS homography matrix.

The homography matrix 901 can output an estimated distance to the potentially offending vehicle 122 from the edge device 102 (or the event camera 114 of the edge device 102) in the GPS space. This estimated distance can then be added to the GPS coordinates of the edge device 102 (determined using the communication and positioning unit 118 of the edge device 102) to determine the GPS coordinates of the potentially offending vehicle 122.

Once the trajectory of the potentially offending vehicle 122 in the GPS space is determined (by applying the homography matrix 901), the trajectory (e.g., the entire trajectory) of the potentially offending vehicle 122 in the GPS space can be provided as an input to a vehicle movement classifier 313 to yield a plurality of movement class predictions 902 and a class confidence score 904 associated with each of the movement class predictions 902.

In some embodiments, the vehicle movement classifier 313 can be run on both the edge device 102 and the server 104. In alternative embodiments, the vehicle movement classifier 313 can be run only on the server 104.

The vehicle movement classifier 313 can be configured to determine whether the potentially offending vehicle 122 is stationary or moving when the potentially offending vehicle 122 was located within the restricted road area 140 (e.g., bus lane or bike lane). It is important to differentiate between a vehicle that is moving and a vehicle that is stationary because, in some jurisdictions or municipalities, a stationary vehicle detected within a bus lane cannot be assessed a bus lane moving violation.

In some embodiments, the vehicle movement classifier 313 can be a neural network. In certain embodiments, the vehicle movement classifier 313 can be a recurrent neural network. For example, the vehicle movement classifier 313 can be a bidirectional long short-term memory (LSTM) network.

The movement class predictions 902 can comprise at least two classes. In some embodiments, the movement class predictions 902 can comprise at least a vehicle stationary class 906 (a prediction that the vehicle was not moving) and a vehicle moving class 908 (a prediction that the vehicle was moving). The class confidence score 904 associated with each of the class predictions can be a numerical score between 0 and 1.0.

In additional embodiments, the movement class predictions 902 can comprise three class predictions including a vehicle stationary class 906, a vehicle moving class 908, and an ambiguous class. In these embodiments, the vehicle movement classifier 313 can also output a class confidence score 904 (e.g., a numerical score between 0 and 1.0) associated with each of the movement class predictions 902.

The class confidence score 904 can be compared against a predetermined threshold based on the movement class prediction 902 to determine whether the potentially offending vehicle 122 was moving when located in the restricted area 140 (e.g., bus lane or bike lane). In some embodiments, the predetermined threshold can be a moving threshold 910 or a stopped threshold 912 (see, e.g., FIG. 9). The class confidence score(s) 904 obtained from the vehicle movement classifier 313 can be passed through this two-threshold-based decision logic to determine whether the potentially offending vehicle 122 was moving or stationary and assign tags to the event.

For example, the edge device 102, the server 104, or a combination thereof can determine that the potentially offending vehicle 122 was moving if the vehicle movement classifier 313 classifies the entire trajectory of the potentially offending vehicle 122 as the vehicle moving class 906 and outputs a class confidence score 904 that is higher than the moving threshold 910. If the restricted area 140 is a bus lane, the edge device 102, the server 104, or a combination thereof can determine that the potentially offending vehicle 122 has committed a bus lane moving violation.

Also, for example, the edge device 102, the server 104, or a combination thereof can determine that the potentially offending vehicle 122 was not moving if the vehicle movement classifier 313 classifies the entire trajectory of the potentially offending vehicle 122 as the vehicle stationary class 908 and outputs a class confidence score 904 that is higher than the stopped threshold 912.

Moreover, the edge device 102, the server 104, or a combination thereof can mark or tag the event video frames 124 for further review if the vehicle movement classifier 313 outputs a class confidence score 904 that is lower than all of the predetermined thresholds (e.g., if the class confidence score 904 is lower than the moving threshold 910 and the stopped threshold 912). For example, the event video frames 124 can be marked, tagged, or flagged for further review by a human reviewer.

As shown in FIG. 3, the server 104 can also comprise at least a knowledge engine 314 comprising an instance of the map layer 303, an events database 316, and an event detection/validation module 318 comprising instances of the object detection deep learning model 308, the lane segmentation deep learning model 312, and the multi-object tracker 309.

In some embodiments, the server 104 can double-check the detection made by the edge device 102 by feeding or passing at least some of the same event video frames 124 to instances of the object detection deep learning model 308 and the lane segmentation deep learning model 312 running on the server 104.

Although FIG. 3 illustrates the event detection/validation module 318 as being on the same server 104 as the knowledge engine 314 and the events database 316, it is contemplated by this disclosure and it should be understood by one of ordinary skill in the art that at least one of the knowledge engine 314 and the events database 316 can be run on another server or another computing device communicatively coupled to the server 104 or otherwise accessible to the server 104.

Software instructions run on the server 104, including any of the engines and modules disclosed herein and depicted in FIG. 3, can be written in the Ruby® programming language (e.g., using the Ruby on Rails® web application framework), Python® programming language, or a combination thereof.

The knowledge engine 314 can be configured to construct a virtual 3D environment representing the real-world environment captured by the cameras of the edge devices 102. The knowledge engine 314 can be configured to construct three-dimensional (3D) semantic annotated maps from videos and data received from the edge devices 102. The knowledge engine 314 can continuously update such maps based on new videos or data received from the edge devices 102. For example, the knowledge engine 314 can use inverse perspective mapping to construct the 3D semantic annotated maps from two-dimensional (2D) video image data obtained from the edge devices 102.

The semantic annotated maps can be built on top of existing standard definition maps and can be built on top of geometric maps constructed from sensor data and salient points obtained from the edge devices 102. For example, the sensor data can comprise positioning data from the communication and positioning units 118 and IMUs of the edge devices 102 and wheel odometry data from the carrier vehicles 110.

The geometric maps can be stored in the knowledge engine 314 along with the semantic annotated maps. The knowledge engine 314 can also obtain data or information from one or more government mapping databases or government GIS maps to construct or further fine-tune the semantic annotated maps. In this manner, the semantic annotated maps can be a fusion of mapping data and semantic labels obtained from multiple sources including, but not limited to, the plurality of edge devices 102, municipal mapping databases, or other government mapping databases, and third-party private mapping databases. The semantic annotated maps can be set apart from traditional standard definition maps or government GIS maps in that the semantic annotated maps are: (i) three-dimensional, (ii) accurate to within a few centimeters rather than a few meters, and (iii) annotated with semantic and geolocation information concerning objects within the maps. For example, objects such as lane lines, lane dividers, crosswalks, traffic lights, no parking signs or other types of street signs, fire hydrants, parking meters, curbs, trees or other types of plants, or a combination thereof are identified in the semantic annotated maps and their geolocations and any rules or regulations concerning such objects are also stored as part of the semantic annotated maps. As a more specific example, all bus lanes or bike lanes within a municipality and their enforcement periods can be stored as part of a semantic annotated map of the municipality.

The semantic annotated maps can be updated periodically or continuously as the server 104 receives new mapping data, positioning data, and/or semantic labels from the various edge devices 102. For example, a bus serving as a carrier vehicle 110 having an edge device 102 installed within the bus can drive along the same bus route multiple times a day. Each time the bus travels down a specific roadway or passes by a specific landmark (e.g., building or street sign), the edge device 102 on the bus can take video(s) of the environment surrounding the roadway or landmark. The videos can first be processed locally on the edge device 102 (using the computer vision tools and deep learning models previously discussed) and the outputs from such detection can be transmitted to the knowledge engine 314 and compared against data already included as part of the semantic annotated maps. If such labels and data match or substantially match what is already included as part of the semantic annotated maps, the detection of this roadway or landmark can be corroborated and remain unchanged. If, however, the labels and data do not match what is already included as part of the semantic annotated maps, the roadway or landmark can be updated or replaced in the semantic annotated maps. An update or replacement can be undertaken if a confidence level or confidence score of the new objects detected is higher than the confidence level or confidence score of objects previously detected by the same edge device 102 or another edge device 102. This map updating procedure or maintenance procedure can be repeated as the server 104 receives more data or information from additional edge devices 102.

As shown in FIG. 3, the server 104 can store the semantic annotated maps as part of a map layer 303. The server 104 can transmit or deploy revised or updated instances of the semantic annotated maps 315 to the edge devices 102 (to be stored as part of the map layer 303 of each of the edge devices 102). For example, the server 104 can transmit or deploy revised or updated semantic annotated maps 315 periodically or when an update has been made to the existing semantic annotated maps. The updated semantic annotated maps 315 can be used by the edge device 102 to determine the locations of restricted lanes 140 to ensure accurate detection. Ensuring that the edge devices 102 have access to updated semantic annotated maps 315 reduces the likelihood of false positive detections.

In some embodiments, the server 104 can store event data or files included as part of the evidence packages 136 in the events database 316. For example, the events database 316 can store event video frames 124 and license plate video frames 126 received as part of the evidence packages 136 received from the edge devices 102. The event detection/validation module 318 can parse out and analyze the contents of the evidence packages 136.

As previously discussed, in some embodiments, the event detection/validation module 318 can undertake an automatic review of the contents of the evidence package 136 without relying on human reviewers. The server 104 can also double-check or validate the detection made by the edge device 102 concerning whether the potentially offending vehicle 122 was moving or stationary. For example, the event detection/validation module 318 can feed a GPS trajectory of the potentially offending vehicle 122 into the vehicle movement classifier 313 running on the server 104 to obtain a plurality of movement class predictions 902 and a class confidence score 904 associated with each of the movement class predictions 902 (see, e.g., FIG. 9).

The server 104 can also render one or more graphical user interfaces (GUIs) 332 that can be accessed or displayed through a web portal or mobile application 330 run on a client device 138. The client device 138 can refer to a portable or non-portable computing device. For example, the client device 138 can refer to a desktop computer or a laptop computer. In other embodiments, the client device 138 can refer to a tablet computer or smartphone.

In some embodiments, one of the GUIs can provide information concerning the context-related features used by the server 104 to validate the evidence packages 136 received by the server 104. The GUIs 332 can also provide data or information concerning times/dates of bus lane moving violations and locations of the bus lane moving violations.

At least one of the GUIs 332 can provide a video player configured to play back video evidence of the bus lane moving violation. For example, at least one of the GUIs 332 can play back videos comprising the event video frames 124, the license plate video frames 126, or a combination thereof.

In another embodiment, at least one of the GUIs 332 can comprise a live map showing real-time locations of all edge devices 102, bus lane moving violations, and violation hot-spots. In yet another embodiment, at least one of the GUIs 332 can provide a live event feed of all flagged events or bus lane moving violations and the validation status of such bus lane moving violations.

In some embodiments, the client device 138 can be used by a human reviewer to review the evidence packages 136 marked or otherwise tagged for further review.

Figure 4:
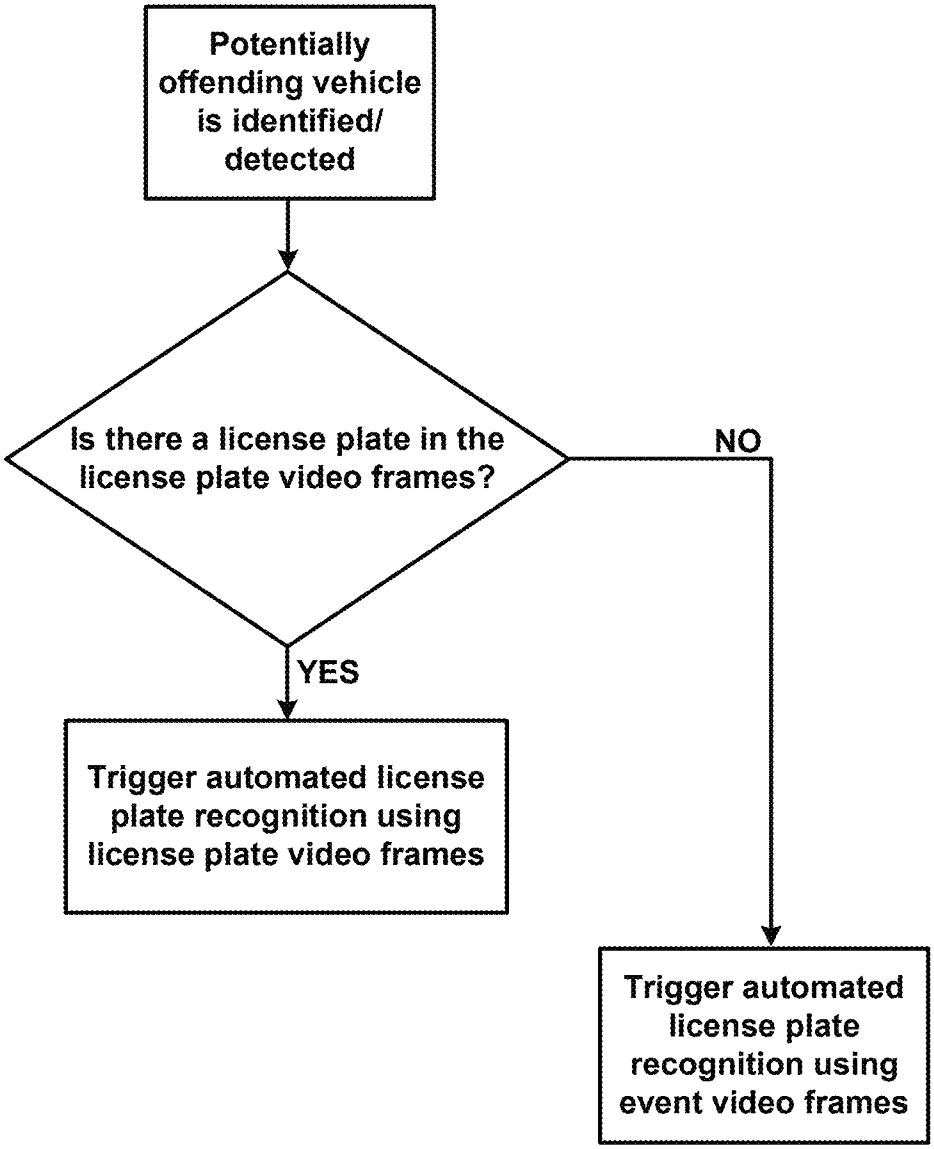
FIG. 4 is a flowchart illustrating the logic of switching from a license plate recognition (LPR) camera to an event camera of the edge device for automated license plate recognition.

FIG. 4 illustrates a flowchart showing the logic of switching from the LPR camera 116 to the event camera 114 for automated license plate recognition when a carrier vehicle 110 carrying the edge device 102 is approaching a potentially offending vehicle 122 directly from behind (see scenario shown in FIG. 5A) or at an insufficient angle such that the LPR camera 116 is not in a position to capture the license plate of the potentially offending vehicle 122.

Once the potentially offending vehicle 122 is detected or identified, a query can be made as to whether a license plate 129 appears in any of the license plate video frames 124 captured by the LPR camera 116. If the answer to this query is yes, such license plate video frames 124 containing the license plate 129 of the potentially offending vehicle 122 can be passed to an LPR deep learning model 310 running on the edge device 102 to automatically recognize the license plate number 128 of the license plate 129. Alternatively, if the answer to this query is no, one or more event video frames 124 captured by the event camera 114 can be used for automated license plate recognition by being passed to the LPR deep learning model 310 running on the edge device 102.

FIG. 5A illustrates an example of an event video frame 124 showing a potentially offending vehicle 122 bounded by a vehicle bounding polygon 500. The event video frame 124 can be one of the video frames grabbed or otherwise retrieved by the event detection engine 300 from the videos captured by the event camera 114 of the edge device 102. As previously discussed, the event detection engine 300 can periodically or continuously pass event video frames 124 from the videos captured by the event camera 114 to an object detection deep learning model 308 running on the edge device 102 (see FIG. 3).

As shown in FIG. 5A, the object detection deep learning model 308 can bound the potentially offending vehicle 122 in the vehicle bounding polygon 500. The event detection engine 300 can obtain as outputs from the object detection deep learning model 308, predictions concerning the objects detected within the video frame including at least an object class 502, an object detection confidence score 504 related to the object detected, and a set of image coordinates 506 for the vehicle bounding polygon 500.

The object detection confidence score 504 can be between 0 and 1.0. In some embodiments, the control unit 112 of the edge device 102 can abide by the results of the detection only if the object detection confidence score 504 is above a preset confidence threshold. For example, the confidence threshold can be set at between 0.65 and 0.90 (e.g., at 0.70).

The event detection engine 300 can also obtain a set of image coordinates 506 for the vehicle bounding polygon 500. The image coordinates 506 can be coordinates of corners of the vehicle bounding polygon 500. For example, the image coordinates 506 can be x- and y-coordinates for an upper left corner and a lower right corner of the vehicle bounding polygon 500. In other embodiments, the image coordinates 506 can be x- and y-coordinates of all four corners or the upper right corner and the lower left corner of the vehicle bounding polygon 500.

In some embodiments, the vehicle bounding polygon 500 can bound at least part of the 2D image of the potentially offending vehicle 122 captured in the event video frame 124 such as a lower half of the potentially offending vehicle 122. In other embodiments, the vehicle bounding polygon 500 can bound the entire two-dimensional (2D) image of the potentially offending vehicle 122 captured in the event video frame 124.

In certain embodiments, the event detection engine 300 can also obtain as an output from the object detection deep learning model 308 predictions concerning a set of vehicle attributes 134 such as a color, make and model, and vehicle type of the potentially offending vehicle 122 shown in the video frames. The vehicle attributes 134 can be used by the event detection engine 300 to make an initial determination as to whether the vehicle shown in the video frames is subject to the bus lane moving violation policy (e.g., whether the vehicle is allowed to drive or otherwise occupy the restricted lane 140).

As shown in FIG. 5A, a potentially offending vehicle 122 can be driving in a restricted lane 140 that is also the lane-of-travel (or "ego lane") of a carrier vehicle 110 carrying the edge device 102. In this scenario, the LPR camera 116 of the edge device 102 cannot be used to capture the license plate 129 of the potentially offending vehicle 122 due to the positioning of the LPR camera 116 (which, in this case, may be pointed to the right side of the carrier vehicle 110).

When a potentially offending vehicle 122 is detected in the event video frame 124 but a license plate 129 is not captured by the LPR camera 116, the edge device 102 (e.g., the license plate recognition engine 304) can trigger the event camera 114 to operate as an LPR camera (see, e.g., FIG. 4). When the event camera 114 is triggered to act as the LPR camera (at least temporarily), the event video frames 124 captured by the event camera 114 can be passed to the LPR deep learning models 310 running on the edge device 102.

FIG. 5B illustrates an example of a license plate video frame 126 showing a license plate 129 of a potentially offending vehicle 122 bounded by a license plate bounding polygon 510. The license plate video frame 126 can be one of the video frames grabbed or otherwise retrieved by the license plate recognition engine 304 from the videos captured by the LPR camera 116 of the edge device 102. As previously discussed, the license plate recognition engine 304 can periodically or continuously pass license plate video frames 126 from the videos captured by the LPR camera 116 to an LPR deep learning model 310 (see FIG. 3) running on the edge device 102.

The LPR deep learning model 310 can be specifically trained to recognize license plate numbers from video frames or images. By feeding the license plate video frame 126 to the LPR deep learning model 310, the control unit 112 of the edge device 102 can obtain as an output from the LPR deep learning model 310, a prediction concerning the license plate number 128 of the potentially offending vehicle 122. The prediction can be in the form of an alphanumeric string representing the license plate number 128. The control unit 112 can also obtain as an output from the LPR deep learning model 310 an LPR confidence score 512 concerning the recognition.

The LPR confidence score 512 can be between 0 and 1.0. In some embodiments, the control unit 112 of the edge device 102 can abide by the results of the recognition only if the LPR confidence score 512 is above a preset confidence threshold. For example, the confidence threshold can be set at between 0.65 and 0.90 (e.g., at 0.70).

FIG. 5C illustrates another example of an event video frame 124 showing a potentially offending vehicle 122 bounded by a vehicle bounding polygon 500 and a lane bounded by a lane bounding polygon. The event video frame 124 can be one of the video frames grabbed or otherwise retrieved from the videos captured by the event camera 114 of the edge device 102. The event detection engine 300 of the edge device 102 can periodically or continuously pass event video frames 124 to the object detection deep learning model 308 and the lane segmentation deep learning model 312 running on the edge device 102 (see FIG. 3). As discussed above in relation to FIG. 5A, the object detection deep learning model 308 can bound the potentially offending vehicle 122 in the vehicle bounding polygon 500 and the control unit 112 of the edge device 102 can obtain as outputs from the object detection deep learning model 308, predictions concerning the object class 502, the object detection confidence score 504, and a set of image coordinates 506 for the vehicle bounding polygon 500.

The event detection engine 300 can also pass or feed event video frames 124 to the lane segmentation deep learning model 312 to detect one or more lanes shown in the event video frames 124. Moreover, the event detection engine 300 can also recognize that one of the lanes detected is a restricted lane 140. For example, the restricted lane 140 can be a lane next to or adjacent to a parking lane or curb.

As shown in FIG. 5C, the lane segmentation deep learning model 312 can bound the restricted lane 140 in a lane-of-interest (LOI) polygon 516. The lane segmentation deep learning model 312 can also output image coordinates 518 associated with the LOI polygon 516.

For example, the LOI polygon 516 can be a quadrilateral. More specifically, the LOI polygon 516 can be shaped substantially as a trapezoid.

In some embodiments, the event detection engine 300 can determine that the potentially offending vehicle 122 is located within the restricted lane 140 based on the amount of overlap between the vehicle bounding polygon 500 bounding the potentially offending vehicle 122 and the LOI polygon 516 bounding the restricted lane 140. For example, the image coordinates 506 associated with the vehicle bounding polygon 500 can be compared with the image coordinates 518 associated with the LOI polygon 516 to determine an amount of overlap between the vehicle bounding polygon 500 and the LOI polygon 516. As a more specific example, the event detection engine 300 can calculate a lane occupancy score to determine whether the potentially offending vehicle 122 is driving in the restricted lane 140. A higher lane occupancy score can be equated with a higher degree of overlap between the vehicle bounding polygon 500 and the LOI polygon 516.

Although FIG. 5C illustrates only one instance of a lane bounding polygon, it is contemplated by this disclosure that multiple lanes can be bound by multiple lane bounding polygons in the same video frame. Moreover, although FIGS. 5A-5C illustrate a visual representation of the vehicle bounding polygon 500, the license plate bounding polygon 510, and the LOI polygon 516, it should be understood by one of ordinary skill in the art that the image coordinates of such bounding boxes and polygons and can be used as inputs only by the edge device 102 or the server 104 or stored in the database 107 without the actual vehicle bounding polygon 500, license plate bounding polygon 510, or LOI polygon 516 being visualized on a screen.

Figure 6:
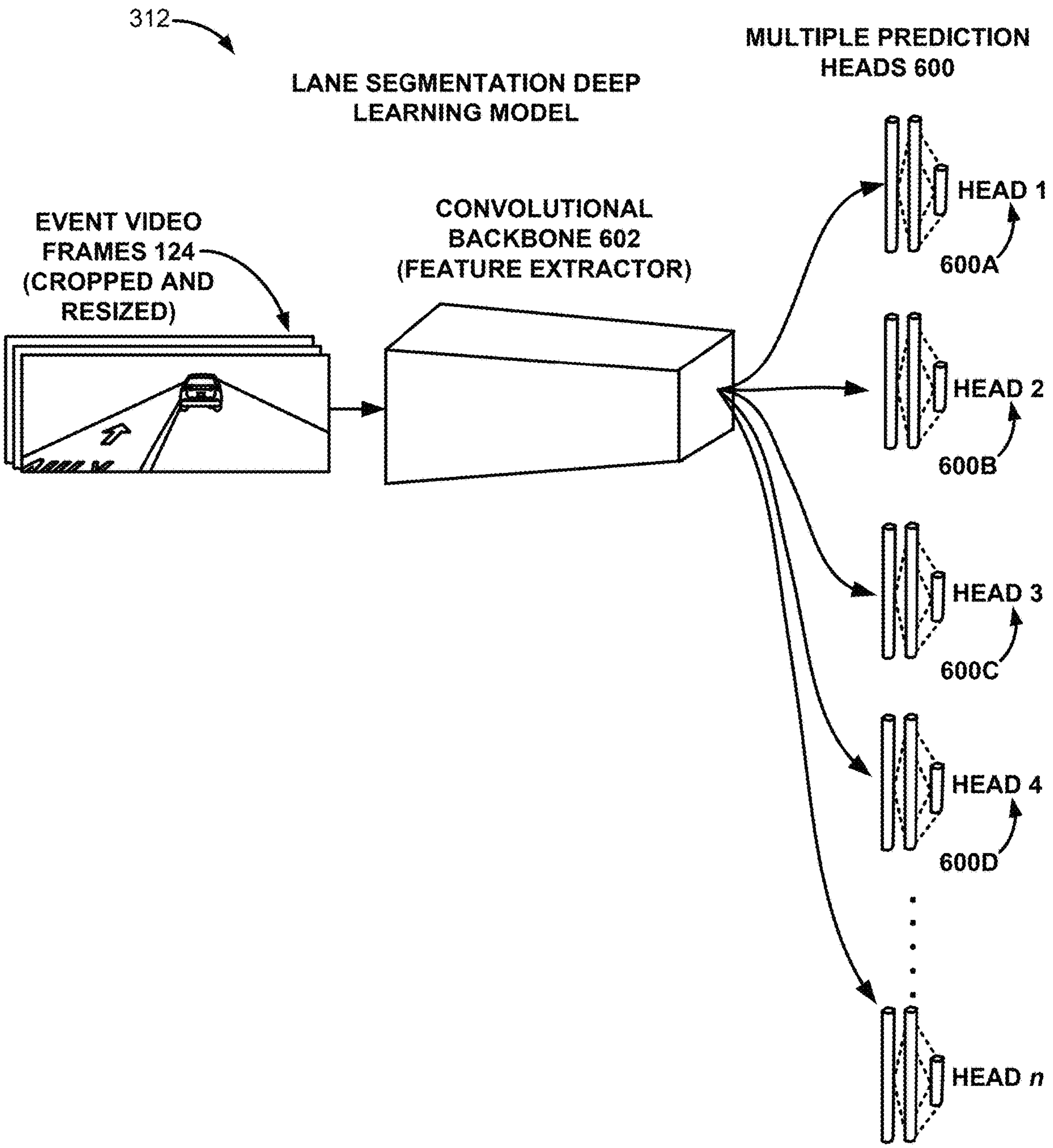
FIG. 6 illustrates a schematic representation of one embodiment of a lane segmentation deep learning model.

FIG. 6 illustrates a schematic representation of one embodiment of the lane segmentation deep learning model 312. As shown in FIG. 6, the lane segmentation deep learning model 312 can be a multi-headed neural network trained for lane detection and segmentation. For example, the lane segmentation deep learning model 312 can be a multi-headed convolutional neural network.

As shown in FIG. 6, the lane segmentation deep learning model 312 can comprise a plurality of prediction heads 600 operating on top of several shared layers. For example, the prediction heads 600 can comprise a first head 600A, a second head 600B, a third head 600C, and a fourth head 600D. The first head 600A, the second head 600B, the third head 600C, and the fourth head 600D can share a common stack of network layers including at least a convolutional backbone 602 (e.g., a feature extractor).

The convolutional backbone 602 can be configured to receive as inputs event video frames 124 that have been cropped and re-sized by certain pre-processing operations. The convolutional backbone 602 can then pool certain raw pixel data and sub-sample certain raw pixel regions of the video frames to reduce the size of the data to be handled by the subsequent layers of the network.

The convolutional backbone 602 can extract certain essential or relevant image features from the pooled image data and feed the essential image features extracted to the plurality of prediction heads 600.

The prediction heads 600, including the first head 600A, the second head 600B, the third head 600C, and the fourth head 600D, can then make their own predictions or detections concerning different types of lanes captured by the video frames.

Although reference is made in this disclosure to four prediction heads 600, it is contemplated by this disclosure that the lane segmentation deep learning model 312 can comprise five or more prediction heads 600 with at least some of the heads 600 detecting different types of lanes. Moreover, it is contemplated by this disclosure that the event detection engine 300 can be configured such that the object detection workflow of the object detection deep learning model 308 is integrated with the lane segmentation deep learning model 312 such that the object detection steps are conducted by an additional head 600 of a singular neural network.

In some embodiments, the first head 600A of the lane segmentation deep learning model 312 can be trained to detect a lane-of-travel. The lane-of-travel can also be referred to as an "ego lane" and is the lane currently occupied by the carrier vehicle 110.

The lane-of-travel can be detected using a position of the lane relative to adjacent lanes and the rest of the video frame. The first head 600A can be trained using a dataset designed specifically for lane detection and segmentation. In other embodiments, the first head 600A can also be trained using video frames obtained from deployed edge devices 102.

In these and other embodiments, the second head 600B of the lane segmentation deep learning model 312 can be trained to detect lane markings. For example, the lane markings can comprise lane lines, text markings, markings indicating a crosswalk, markings indicating turn lanes, dividing line markings, or a combination thereof.

In some embodiments, the third head 600C of the lane segmentation deep learning model 312 can be trained to detect the restricted lane 140. In other embodiments, the restricted lane 140 can be a bus lane, a bike lane, or a fire lane. The third head 600C can detect the restricted lane 140 based on an automated lane detection algorithm.

The third head 600C can be trained using video frames obtained from deployed edge devices 102. In other embodiments, the third head 600C can also be trained using training data (e.g., video frames) obtained from a dataset.

The fourth head 600D of the lane segmentation deep learning model 312 can be trained to detect one or more adjacent or peripheral lanes after the restricted lane 140 is detected. In some embodiments, the adjacent or peripheral lanes can be lanes immediately adjacent to the restricted lane 140 or the lane-of-travel, or lanes further adjoining the immediately adjacent lanes. In certain embodiments, the fourth head 600D can detect the adjacent or peripheral lanes based on a determined position of the restricted lane 140 and/or the lane-of-travel. The fourth head 600D can be trained using video frames obtained from deployed edge devices 102. In other embodiments, the fourth head 600D can also be trained using training data (e.g., video frames) obtained from a dataset.

In some embodiments, the training data (e.g., video frames) used to train the prediction heads 600 (any of the first head 600A, the second head 600B, the third head 600C, or the fourth head 600D) can be annotated using semantic segmentation. For example, the same video frame can be labeled with multiple labels (e.g., annotations indicating a bus lane, a lane-of-travel, adjacent/peripheral lanes, crosswalks, etc.) such that the video frame can be used to train multiple or all of the prediction heads 600.

Figure 7B:
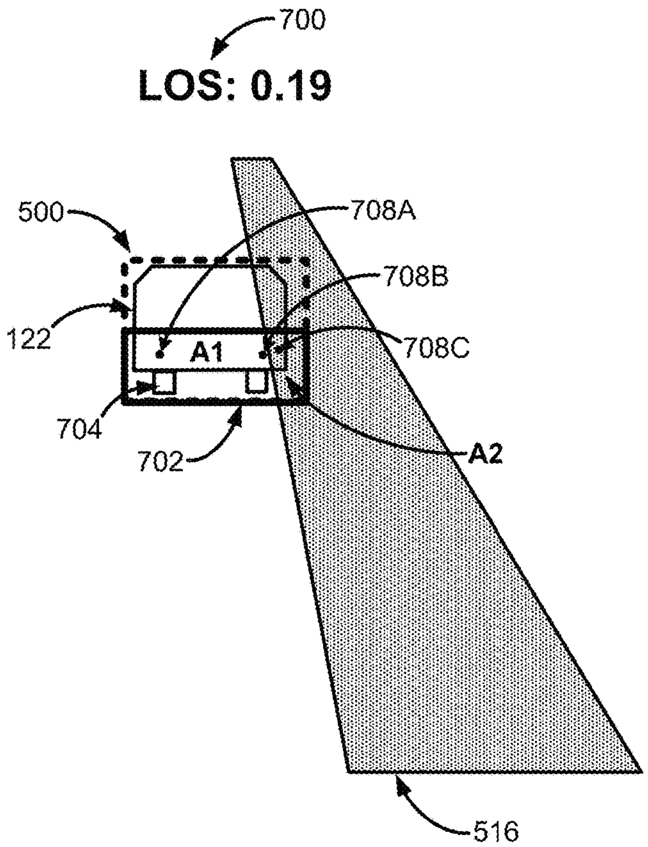

FIGS. 7A and 7B illustrate one embodiment of a method of calculating a lane occupancy score 700. In this embodiment, the lane occupancy score 700 can be calculated based in part on the translated image coordinates 506 of the vehicle bounding polygon 500 and the translated image coordinates 518 of the LOI polygon 516. As previously discussed, the translated image coordinates 506 of the vehicle bounding polygon 500 and the LOI polygon 516 can be based on the same uniform coordinate domain (for example, a coordinate domain of the video frame originally captured).

As shown in FIGS. 7A and 7B, an upper portion of the vehicle bounding polygon 500 can be discarded or left unused such that only a lower portion of the vehicle bounding polygon 500 (also referred to as a lower bounding polygon 702) remains. In some embodiments, the lower bounding polygon 702 can be a truncated version of the vehicle bounding polygon 500 including only the bottom 5% to 30% (e.g., 15%) of the vehicle bounding polygon 500. For example, the lower bounding polygon 702 can be the bottom 15% of the vehicle bounding polygon 500.

As a more specific example, the lower bounding polygon 702 can be substantially rectangular with a height dimension equal to between 5% to 30% of the height dimension of the vehicle bounding polygon 500 but with the same width dimension as the vehicle bounding polygon 500. As another example, the lower bounding polygon 702 can be substantially rectangular with an area equivalent to between 5% to 30% of the total area of the vehicle bounding polygon 500. In all such examples, the lower bounding polygon 702 can encompass the tires 704 of the potentially offending vehicle 122 captured in the event video frame 124. Moreover, it should be understood by one of ordinary skill in the art that although the word "box" is sometimes used to refer to the vehicle bounding polygon 500 and the lower bounding polygon 702, the height and width dimensions of such bounding "boxes" do not need to be equal.

The method of calculating the lane occupancy score 700 can also comprise masking the LOI polygon 516 such that the entire area within the LOI polygon 516 is filled with pixels. For example, the pixels used to fill the area encompassed by the LOI polygon 516 can be pixels of a certain color or intensity. In some embodiments, the color or intensity of the pixels can represent or correspond to a confidence level or confidence score outputted by the object detection deep learning model 308, the lane segmentation deep learning model 312, or a combination thereof.

The method can further comprise determining a pixel intensity value associated with each pixel within the lower bounding polygon 702. The pixel intensity value can be a decimal number between 0 and 1. In some embodiments, the pixel intensity value corresponds to a confidence score or confidence level provided by the lane segmentation deep learning model 312 that the pixel is part of the LOI polygon 516. Pixels within the lower bounding polygon 702 that are located within a region that overlaps with the LOI polygon 516 can have a pixel intensity value closer to 1. Pixels within the lower bounding polygon 702 that are located within a region that does not overlap with the LOI polygon 516 can have a pixel intensity value closer to 0. All other pixels including pixels in a border region between overlapping and non-overlapping regions can have a pixel intensity value in between 0 and 1.

For example, as shown in FIG. 7A, a potentially offending vehicle 122 can be driving in a restricted lane 140 that has been bounded by an LOI polygon 516. The LOI polygon 516 has been masked by filling in the area encompassed by the LOI polygon 516 with pixels. A lower bounding polygon 702 representing a lower portion of the vehicle bounding polygon 500 has been overlaid on the masked LOI polygon 516 to represent the overlap between the two bounded regions.

FIG. 7A illustrates three pixels within the lower bounding polygon 702 including a first pixel 706A, a second pixel 706B, and a third pixel 706C. Based on the scenario shown in FIG. 7A, the first pixel 706A is within an overlap region (shown as A1 in FIG. 7A), the second pixel 706B is located on a border of the overlap region, and the third pixel 706C is located in a non-overlapping region (shown as A2 in FIG. 7A). In this case, the first pixel 706A can have a pixel intensity value of about 0.99, the second pixel 706B can have a pixel intensity value of about 0.65, and the third pixel 706C can have a pixel intensity value of about 0.09.

FIG. 7B illustrates an alternative scenario where a potentially offending vehicle 122 is driving in a lane adjacent to a restricted lane 140 that has been bounded by an LOI polygon 516. In this scenario, the potentially offending vehicle 122 is not actually in the restricted lane 140. Three pixels are also shown in FIG. 7B including a first pixel 708A, a second pixel 708B, and a third pixel 708C. The first pixel 708A is within a non-overlapping region (shown as A1 in FIG. 8B), the second pixel 708B is located on a border of the non-overlapping region, and the third pixel 708C is located in an overlap region (shown as A2 in FIG. 7B). In this case, the first pixel 708A can have a pixel intensity value of about 0.09, the second pixel 708B can have a pixel intensity value of about 0.25, and the third pixel 708C can have a pixel intensity value of about 0.79.

With these pixel intensity values determined, a lane occupancy score 700 can be calculated. The lane occupancy score 700 can be calculated by taking an average of the pixel intensity values of all pixels within each of the lower bounding polygons 702. The lane occupancy score 700 can also be considered the mean mask intensity value of the portion of the LOI polygon 516 within the lower bounding polygon 702.

For example, the lane occupancy score 700 can be calculated using Formula I below:

$$\text{Lane Occupancy Score} = \frac{\sum_{i=1}^{n} \text{Pixel Intensity Value}_i}{n} \qquad \text{Formula I}$$

where n is the number of pixels within the lower portion of the vehicle bounding polygon (or lower bounding polygon 702) and where the Pixel Intensity Value$_i$ is a confidence level or confidence score associated with each of the pixels within the LOI polygon 516 relating to a likelihood that the pixel is depicting part of a bus lane such as a restricted lane 140.

In some embodiments, the lane occupancy score 700 can be used to determine whether the potentially offending vehicle 122 is located within the restricted lane 140 (e.g., bus lane or bike lane). For example, the potentially offending vehicle 122 can be determined to be located within the restricted lane 140 when the lane occupancy score 700 exceeds a predetermined threshold value.

Going back to the scenarios shown in FIGS. 7A and 7B, the lane occupancy score 700 of the potentially offending vehicle 122 shown in FIG. 7A can be calculated as approximately 0.89 while the lane occupancy score 700 of the potentially offending vehicle 122 shown in FIG. 7B can be calculated as approximately 0.19. In both cases, the predetermined threshold value for the lane occupancy score 700 can be set at 0.75. With respect to the scenario shown in FIG. 7A, the event detection engine 300 can calculate the lane occupancy score 700 and determine that the potentially offending vehicle 122 was located within the restricted lane 140 at the time that this particular event video frame 124 was captured. In certain embodiments, the event detection engine 300 can generate an evidence package 136 to be sent to the server 104 in response to detecting that the potentially offending vehicle 122 was located within the restricted lane 140.

With respect to the scenario shown in FIG. 7B, the event detection engine 300 can determine that the potentially offending vehicle 122 was not located within the restricted lane 140 at the time that this particular event video frame 124 was captured. In cases where the event video frames 124 do not show the potentially offending vehicle 122 as being located within the restricted lane 140, these event video frames 124 are not further analyzed or processed to determine the trajectory of the potentially offending vehicle 122.

Figure 8A:
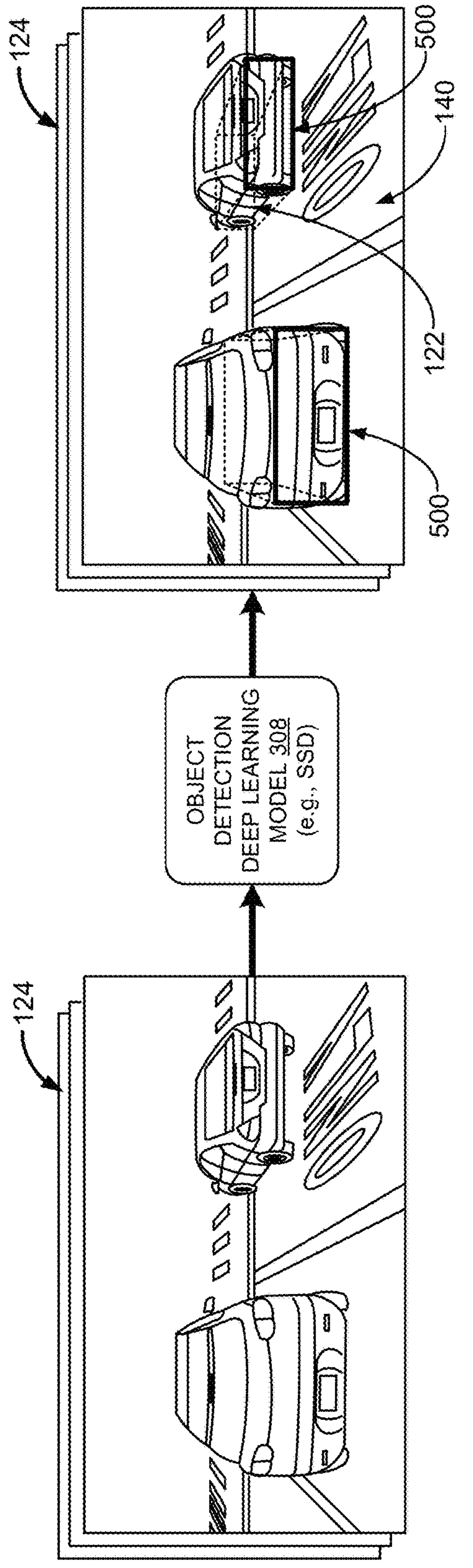
FIG. 8A illustrates example event video frames being provided as inputs to an object detection deep learning model.

FIG. 8A illustrates example event video frames 124 provided as inputs to an object detection deep learning model 308. The event video frames 124 can be extracted or otherwise read from event videos captured or recorded by the event camera 114 of the edge device 102.

The object detection deep learning model 308 can be trained or configured to identify vehicles from the event video frames 124 and bound at least part of the vehicles in vehicle bounding polygons 500.

As previously discussed, the object detection deep learning model 308 can comprise a plurality of convolutional layers and connected layers trained for object detection (and, in particular, vehicle detection). In some embodiments, the object detection deep learning model 308 can be a convolutional neural network trained for object detection and, more specifically, for the detection of vehicles.

For example, the object detection deep learning model 308 can be the Single Shot Detection (SSD) model using a residual neural network backbone (e.g., ResNet-10 network) as the feature extractor.

In other embodiments, the object detection deep learning model 308 can be a version of the You Only Look Once (YOLO) object detection model or the YOLO Lite object detection model.

Figure 8B:
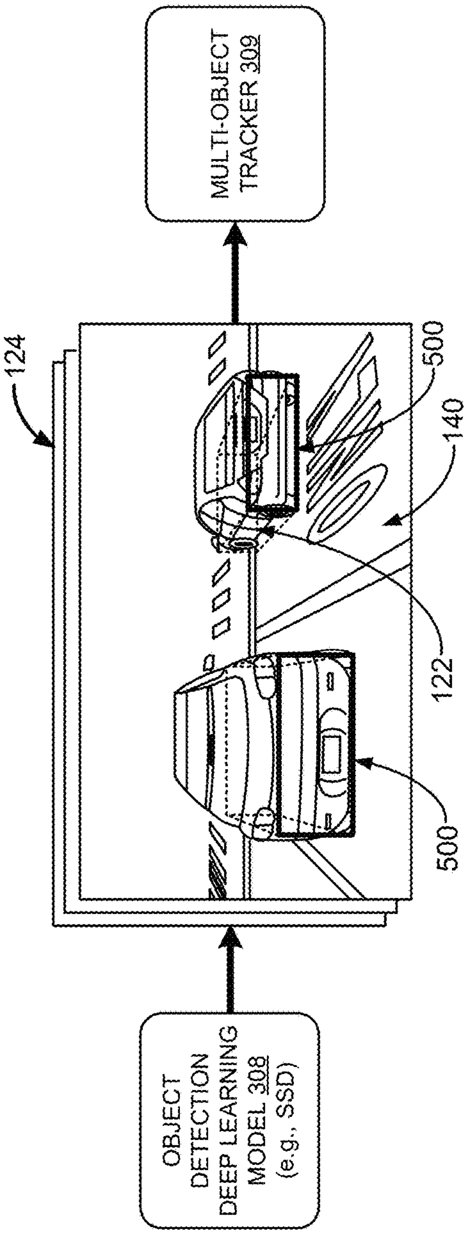
FIG. 8B illustrates the outputs of the object detection deep learning model being provided as inputs to a multi-object tracker event.

FIG. 8B illustrates that the event video frames 124 and the vehicle bounding polygons 500 outputted by the object detection deep learning model 308 can then be provided as inputs to a multi-object tracker 309. The multi-object tracker 309 can track or associate the vehicle bounding polygons 500 of the potentially offending vehicle 122 across multiple event video frames 124.

The multi-object tracker 309 can be a GPU-accelerated multi-object tracker 309. In some embodiments, the multi-object tracker 309 can be a multi-object tracker included as part of the NVIDIA DeepStream SDK.

For example, the multi-object tracker 309 can be any of the NvSORT tracker, the NvDeepSORT tracker, or the NvDCF tracker included as part of the NVIDIA DeepStream SDK.

In some embodiments, the object detection deep learning model 308 and the multi-object tracker 309 can both be run on the NVIDIA™ Jetson Xavier NX module of the control unit 112.

The vehicle bounding polygons 500 can also be connected across multiple frames using a tracking algorithm such as a mixed integer linear programming (MILP) algorithm.

Figure 8C:
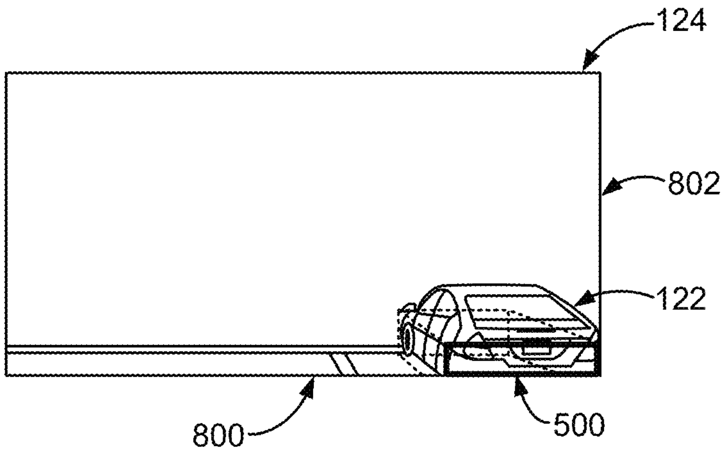
FIG. 8C illustrates an example of an event video frame where the vehicle bounding polygon touches a bottom edge and a right edge of the event video frame.

FIG. 8C illustrates an example of an event video frame 124 where the vehicle bounding polygon 500 touches a bottom edge 800 and a right edge 802 of the event video frame 124. In cases where the vehicle bounding polygon 500 touches either the bottom edge 800 or the right edge 802 of an event video frame 124, such a vehicle bounding polygon 500 is not used to determine the trajectory of the potentially offending vehicle 122 in an image space of the video frames. When a vehicle bounding polygon 500 touches either the bottom edge 800 or the right edge 802 of the event video frame 124, such a vehicle bounding polygon 500 is replaced by the last vehicle bounding polygon 500 in the vehicle's trajectory that does not touch either the bottom edge 800 or the right edge 802 of its event video frame 124. This is done to ensure that only those points in the trajectory of the vehicle are included where the rear of the potentially offending vehicle 122 is entirely visible in the event video frame 124.

When a vehicle bounding polygon 500 enclosing a potentially offending vehicle 122 touches the bottom edge 800 or the right edge 802 of an event video frame 124, the event video frame 124 will often show the rear of the potentially offending vehicle 122 as being cut off or only partially visible. This usually happens when the carrier vehicle 110 carrying the edge device 102 surpasses the potentially offending vehicle 122. One unexpected discovery made by the applicant is that including such vehicle bounding polygons 500 into calculations concerning the trajectory of the potentially offending vehicle 122 leads to a GPS displacement issue that results in false positive results, especially for vehicles with longer vehicle bodies. Therefore, excluding such event video frames 124 and their vehicle bounding polygons 500 from calculations concerning the trajectory of the potentially offending vehicle 122 improves the precision of the vehicle movement classifier 313.

Figure 8D:
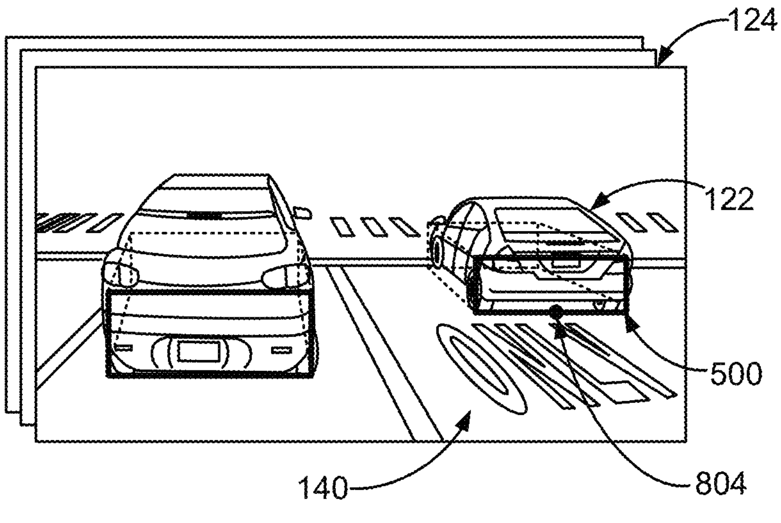
FIG. 8D illustrates an example of an event video frame where a potentially offending vehicle is bounded by a vehicle bounding polygon and a point along a bottom edge of the vehicle bounding polygon is used as a point in the image space for representing the potentially offending vehicle.

FIG. 8D illustrates an example of an event video frame where a potentially offending vehicle 122 is bounded by a vehicle bounding polygon 500. As depicted in FIG. 8D, a point 804 along a bottom edge of the vehicle bounding polygon 500 can be used as a point in the image space for representing the potentially offending vehicle 122 when projecting the potentially offending vehicle 122 from the image space (i.e., a coordinate domain of the event video frames 124) to the GPS space.

In some embodiments, the point 804 can be a midpoint along the bottom edge of the vehicle bounding polygon 500.

The reason for using the point 804 along the bottom center of the vehicle bounding polygon 500 is that the camera-to-GPS homography matrix used to transform the trajectory of the potentially offending vehicle 122 from the image space to the GPS space relies on the assumption that the point 804 lies on the ground.

The applicant also discovered that using the point 804 along the bottom center of the vehicle bounding polygon 500 to represent the potentially offending vehicle 122 helps to improve the accuracy of downstream estimations of the location of the potentially offending vehicle 122 for tracking the trajectory of the vehicle.

Figure 9:
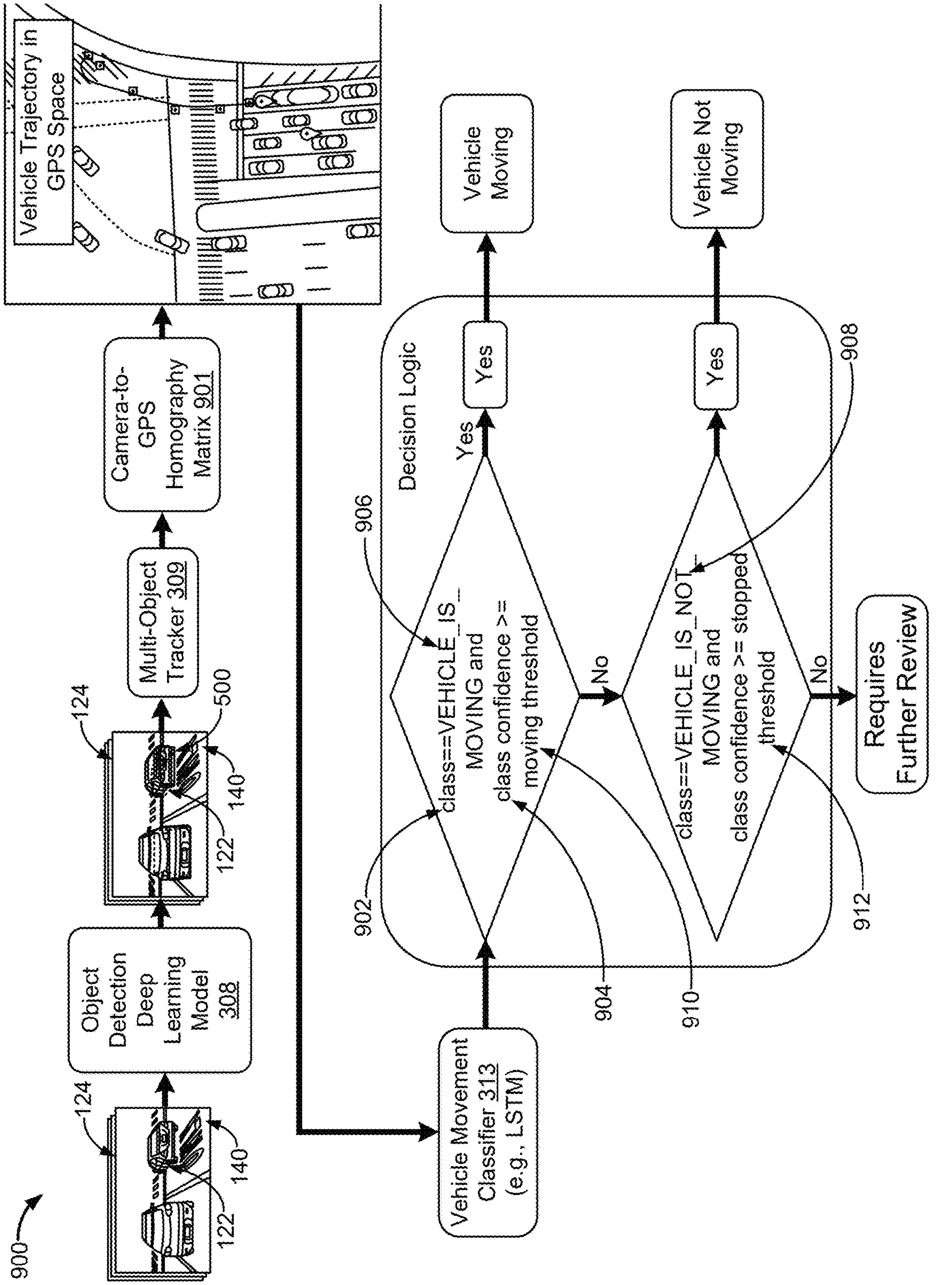
FIG. 9 illustrates one embodiment of a method of automatically detecting a bus lane moving violation.

FIG. 9 illustrates one embodiment of a method 900 of automatically detecting a bus lane moving violation. The method 900 can comprise inputting event video frames 124 to an object detection deep learning model 308 running on the edge device. The object detection deep learning model 308 can detect a potentially offending vehicle 122 and bound the potentially offending vehicle 122 shown in each of the event video frames 124 in a vehicle bounding polygon 500 (see also FIG. 8A). As previously discussed, the event video frames 124 can be captured using an event camera 114 of an edge device 102. The event video frames 124 can show the potentially offending vehicle 122 located in restricted road area 140 such as a bus lane or bike lane.

In some embodiments, the object detection deep learning model 308 can be a convolutional neural network trained for object detection and, more specifically, for the detection of vehicles. For example, the object detection deep learning model 308 can be the Single Shot Detection (SSD) model using a residual neural network backbone (e.g., ResNet-10 network) as the feature extractor.

The method 900 can also comprise inputting the outputs from the object detection deep learning model 308 to a multi-object tracker 309 (see also FIG. 8B). The multi-object tracker 309 can track or associate the vehicle bounding polygons 500 across multiple event video frames 124. In some embodiments, the multi-object tracker 309 can be a multi-object tracker included as part of the NVIDIA® DeepStream SDK. For example, the multi-object tracker 309 can be any of the NvSORT tracker, the NvDeepSORT tracker, or the NvDCF tracker.

In some embodiments, both the object detection deep learning model 308 and the multi-object tracker 309 can be run on the NVIDIA™ Jetson Xavier NX module of the control unit 112.

In some embodiments, a potential bus lane moving violation event can be created if the potentially offending vehicle 122 appears for more than a (configurable) number of event video frames 124 within a (configurable) period of time. In these embodiments, the relevant event video frames 124, information concerning the vehicle tracking polygons 500, the tracking results, and certain metadata concerning the event can be included as part of an evidence package 136 transmitted to the server 104 for further analysis and event detection.

In additional embodiments, a potential bus lane moving violation event can be created if the potentially offending vehicle 122 is detected within the restricted lane 140 (e.g., a bus lane or bike lane) based in part on an amount of overlap of at least part of the vehicle bounding polygon 500 and a LOI polygon 516 (see, e.g., FIGS. 5C and 7A). In these embodiments, the relevant event video frames 124, information concerning the vehicle tracking polygons 500 and the LOI polygon 516, the tracking results, and certain metadata concerning the event can be included as part of an evidence package 136 transmitted to the server 104 for further analysis and event detection.

The server 104 can receive the evidence package 136 and parse the detection results, the tracking results, and the event metadata from the evidence package 136 to determine a trajectory of the potentially offending vehicle 122 in an image space of the event video frames 124 (i.e., a coordinate domain of the event video frames 124). For example, the image space of the event video frames 124 can have an origin at a top-left of the video frame or image.

The trajectory of the potentially offending vehicle 122 in the image space can comprise vehicle bounding polygons 500 and frame numbers of the event video frames 124.

The method 900 can also comprise replacing any of the vehicle bounding polygons 500 if any of the vehicle bounding polygons 500 touch or overlap with a bottom edge 800 or right edge 802 of the event video frame 124. As previously discussed in relation to FIG. 8C, this is done to ensure that only those points in the trajectory of the vehicle are included where the rear of the potentially offending vehicle 122 is entirely visible in the event video frame 124. In cases where the vehicle bounding polygon 500 touches either the bottom edge 800 or the right edge 802 of an event video frame 124, such a vehicle bounding polygon 500 is not used to determine the trajectory of the potentially offending vehicle 122 in the image space and the vehicle bounding polygon 500 is replaced by the last vehicle bounding polygon 500 in the vehicle's trajectory that does not touch either the bottom edge 800 or the right edge 802 of its event video frame 124.

In some embodiments, this replacement step can be done at the server 104. In other embodiments, this replacement step can be done on the edge device 102.

The method 900 can further comprise transforming the trajectory of the potentially offending vehicle 122 in the image space into a trajectory of the vehicle in a GPS space (i.e., using GPS coordinates in latitude and longitude). Transforming the trajectory of the potentially offending vehicle 122 from the image space into the GPS space can be done using, in part, a homography matrix 901. For example, the homography matrix 901 can be a camera-to-GPS homography matrix.

The homography matrix 901 can output an estimated distance to the potentially offending vehicle 122 from the edge device 102 (or the event camera 114 of the edge device 102) in the GPS space. This estimated distance can then be added to the GPS coordinates of the edge device 102 (determined using the communication and positioning unit 118 of the edge device 102) to determine the GPS coordinates of the potentially offending vehicle 122.

In some embodiments, a point 804 along a bottom edge of the vehicle bounding polygon 500 can be used as a point in the image space for representing the potentially offending vehicle 122 when projecting the potentially offending vehicle 122 from the image space to the GPS space (see, e.g., FIG. 8D). The point 804 can be a midpoint along the bottom edge of the vehicle bounding polygon 500. The reason for using the bottom center of the vehicle bounding polygon 500 for the projection is that the camera-to-GPS homography matrix relies on the assumption that the point 804 lies on the ground.

In some embodiments, the homography matrix 901 (e.g., the camera-to-GPS homography) can be calibrated for every edge device 102 such that its edge device 102 has its own homography matrix 901.

A calibration tool can be used for the calibration of the homography matrix 901. The calibration tool can comprise an event video frame 124 captured by the event camera 114 and its corresponding map view. The map view indicates the layout of the points as they appear in the real world. This means projecting a rectangle in the event video frame 124 would result in a trapezoid in the map view. This is because points in the image space closer to the top of an event video frame 124 are further apart than the points closer to the bottom of the event video frame 124. The calibration process involves selecting corresponding points (e.g., a minimum of four points) from the event video frame 124 and the map view. These points are used to calculate the homography matrix 901.

A robust homography check is applied after the calibration process is completed and this calibration process is repeated. This is done to ensure the calibration is carried out at high quality. The homography check projects four corners of the event video frame 124 using the homography matrix 901 and compares it against a gold standard polygon. The comparison with the gold standard polygon is done using intersection over union, intersection over minimum area, and inclination angle between the top and bottom edge with respect to the corresponding edges of the gold standard polygon. The high-quality calibration and usage of the robust homography check is one of the major contributors to the optimal performance of the homography matrix 901 so that the homography matrix 901 does not add any unwanted noise to data that is eventually fed into the vehicle movement classifier 313.

Once the trajectory of the potentially offending vehicle 122 in the GPS space is determined (by applying the homography matrix 901), the method 900 can comprise inputting the trajectory of the potentially offending vehicle 122 in the GPS space to a vehicle movement classifier 313 to yield a plurality of movement class predictions 902 and a class confidence score 904 associated with each of the movement class predictions 902.

As will be discussed in more detail in relation to FIG. 10, the vehicle movement classifier 313 can be a multiclass sequence classifier.

In some embodiments, the vehicle movement classifier 313 can be a neural network. In certain embodiments, the vehicle movement classifier 313 can be a recurrent neural network. For example, the vehicle movement classifier 313 can be a bidirectional long short-term memory (LSTM) network.

The movement class predictions 902 can comprise at least two classes. In some embodiments, the movement class predictions 902 can comprise at least a vehicle stationary class 906 and a vehicle moving class 908. The vehicle stationary class 906 is a class prediction made by the vehicle movement classifier 313 that the potentially offending vehicle 122 was stationary or not moving during an event period (for example, when the potentially offending vehicle 122 was detected within the restricted area 140 of the bus lane or bike lane). The vehicle moving class 908 is a class prediction made by the vehicle movement classifier 313 that the potentially offending vehicle 122 was moving during the event period (for example, when the potentially offending vehicle 122 was detected within the restricted area 140 of the bus lane or bike lane). It is important to differentiate between a vehicle that is moving and a vehicle that is stationary because, in many jurisdictions or municipalities, only moving vehicles detected within a bus lane can be assessed a bus lane moving violation.

In some embodiments, the class confidence score 904 can be a numerical score between 0 and 1.0 (e.g., 0.10, 0.20, 0.30, 0.40, 0.50, 0.60, 0.70, 0.80, 0.90, or any numerical scores therebetween). In certain embodiments, the vehicle movement classifier 313 can output a class confidence score 904 for each of the movement class predictions 902.

The method 900 can further comprise evaluating each of the class confidence scores 904 against a predetermined threshold based on its movement class prediction 902 to determine whether the potentially offending vehicle 122 was moving when located in the restricted area 140 (e.g., bus lane or bike lane).

In some embodiments, the predetermined thresholds can comprise a moving threshold 910 and a stopped threshold 912. Each class confidence score 904 or the highest class confidence score 904 obtained from the vehicle movement classifier 313 can be passed through this two-threshold-based decision logic to determine whether the potentially offending vehicle 122 was moving or stationary and assign tags to the event.

The method 900 can further comprise automatically determining that the potentially offending vehicle 122 was moving if the movement class prediction 902 made by the vehicle movement classifier 313 is the vehicle moving class 906, the class confidence score 904 associated with the vehicle moving class 906 is the highest score out of all of the class confidence scores 904, and the class confidence score 904 associated with the vehicle moving class 906 is higher than the moving threshold 910. In this case, a vehicle moving tag can be applied to or otherwise associated with the event and the potentially offending vehicle 122 shown in the event video frames 124 can be determined to have committed a bus lane moving violation when the restricted area 140 is a bus lane.

In alternative embodiments, the potentially offending vehicle 122 shown in the event video frames 124 can be determined to have committed a bike or bicycle lane moving violation when the restricted area 140 is a bike or bicycle lane.

The method 900 can also comprise automatically determining that the potentially offending vehicle 122 was not moving if the movement class prediction 902 made by the vehicle movement classifier 313 is the vehicle stationary class 908, the class confidence score 904 associated with the vehicle stationary class 908 is the highest score out of all of the class confidence scores 904, and the class confidence score 904 associated with the vehicle stationary class 908 is higher than the stopped threshold 912. In this case, a vehicle not moving tag can be applied to or otherwise associated with the event and the potentially offending vehicle 122 shown in the event video frames 124 can be determined to not have committed a bus lane moving violation.

The method 900 can further comprise automatically tagging, flagging, or marking the event video frames 124 for further review if the class confidence score 904 outputted by the vehicle movement classifier 313 is lower than the stopped threshold 912. For example, the event video frames 124 can be marked, tagged, or flagged for further review by a human reviewer.

In some embodiments, the movement class predictions 902 can comprise an additional class in addition to the vehicle moving class 906 and the vehicle stationary class 908. For example, an ambiguous movement class prediction can be outputted in addition to the vehicle moving class 906 and the vehicle stationary class 908. Adding a third class (e.g., the ambiguous movement class) improves the performance of the vehicle movement classifier 313 by allowing the classifier to classify low-confidence predictions into this third class, thus allowing the model to gain a more nuanced understanding of uncertainty.

In some embodiments, certain steps of the method 900 can be performed by the one or more server processors 222 of the server 104 (see, e.g., FIG. 2B). For example, at least one of the following steps can be done on the server 104: transforming the trajectory of the potentially offending vehicle 122 from the image space into the GPS space; inputting the trajectory to the vehicle movement classifier 313 to yield the movement class prediction 902 and the class confidence score 904; and evaluating the class confidence score 904 against a predetermined threshold based on the movement class prediction 902 to determine whether the potentially offending vehicle 122 was moving or stationary.

In other embodiments, all of the steps of the method 900 can be performed by one or more processors of the control unit 112 of the edge device 102. In these and other embodiments, the server 104 can still receive an evidence package 136 from the edge device 102 and the server 104 can validate or review the determination made by the edge device 102 and/or evaluate the evidence from the evidence package 136 using more robust versions of the deep learning models or classifiers running on the edge device 102.

Figure 10:
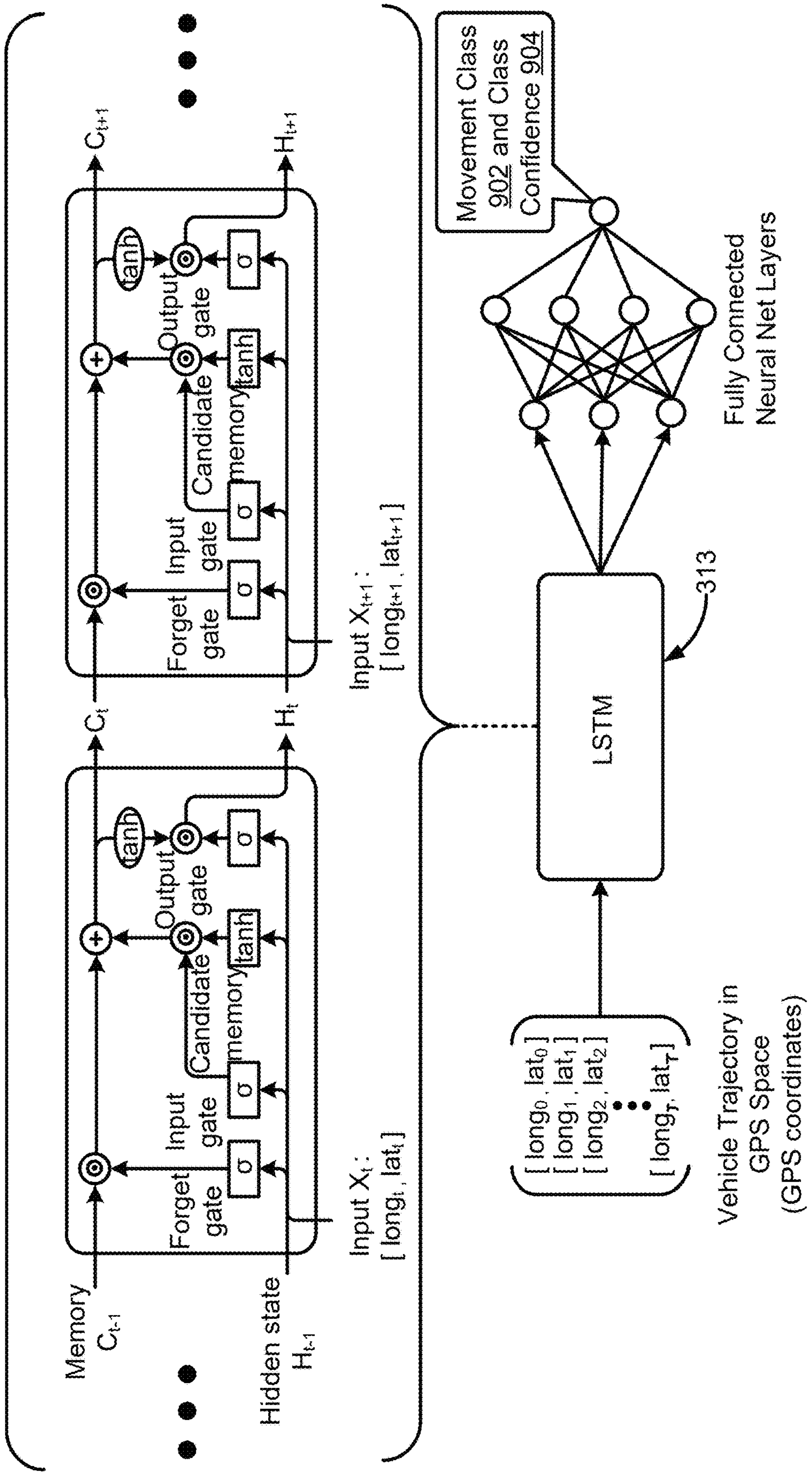
FIG. 10 illustrates one embodiment of a long short-term memory (LSTM) network that can be used as a vehicle movement classifier.

FIG. 10 illustrates one embodiment of a long short-term memory (LSTM) network that can be used as the vehicle movement classifier 313. The vehicle movement classifier 313 can receive as an input the entire vehicle trajectory of the potentially offending vehicle 122 in the GPS space (e.g., GPS coordinates of the vehicle trajectory in latitude and longitude) and output a movement class prediction 902 and a class confidence score 904.

In some embodiments, the vehicle movement classifier 313 can be a neural network. In certain embodiments, the neural network can be a convolutional neural network. In alternative embodiments, the neural network can have a transformer architecture.

In some embodiments, the vehicle movement classifier 313 can be a recurrent neural network such as a LSTM network or a gated recurrent unit (GRU). A recurrent neural network is a type of neural network where the output from the previous step is fed as an input to the current step. The data sequence (e.g., vehicle trajectory) can be fed to the LSTM sequentially starting with the first input t=0, the output of this step can then be combined with the data from the next time step, t=1, and then fed into the LSTM once again. This process continues until all inputs have been digested by the model, with the final output of the LSTM or a combination of the intermediate states being taken as the final result.

When the vehicle movement classifier 313 is a LSTM network, the LSTM network can be a bidirectional LSTM with two fully connected layers on the last hidden timestep. The LSTM network can be designed to tackle the vanishing gradient problem, an issue prevalent in traditional RNNs. The LSTM network accomplishes this by maintaining an internal representation, the memory, C, which is input to each sequential step via the hidden state, H, and subsequently updated. This allows the internal state information to flow from the first step to the last.

Bidirectional LSTMs can be comprised of two LSTMs, one for processing inputs in the forward direction and the other in the backward direction. The outputs of each of these LSTMs are combined for the final representation fed to a plurality of fully connected layers. For some tasks, it can be helpful to use multiple LSTMs which are "stacked" on top of each other. Meaning the intermediate hidden states from the previous LSTM are fed into the following LSTM.

In alternative embodiments, the vehicle movement classifier can be a logistic regression model that takes as inputs the standard deviation of the latitude, longitude, and cross-correlation of the GPS trajectory of the potentially offending vehicle 122.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps or operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s), or step(s) to the objective(s), spirit, or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

Reference to the phrase "at least one of", when such phrase modifies a plurality of items or components (or an enumerated list of items or components) means any combination of one or more of those items or components. For example, the phrase "at least one of A, B, and C" means: (i) A; (ii) B; (iii) C; (iv) A, B, and C; (v) A and B; (vi) B and C; or (vii) A and C.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved.

Finally, terms of degree such as "substantially", "about" and "approximately" as used herein mean the specified value or the specified value and a reasonable amount of deviation from the specified value (e.g., a deviation of up to ±0.1%, ±1%, ±5%, or ±10%, as such variations are appropriate) such that the end result is not significantly or materially changed. For example, "about 1.0 cm" can be interpreted to mean "1.0 cm" or between "0.9 cm and 1.1 cm." When terms of degree such as "about" or "approximately" are used to refer to numbers or values that are part of a range, the term can be used to modify both the minimum and maximum numbers or values.

The term "engine" or "module" as used herein can refer to software, firmware, hardware, or a combination thereof. In the case of a software implementation, for instance, these may represent program code that performs specified tasks when executed on a processor (e.g., CPU, GPU, or processor cores therein). The program code can be stored in one or more computer-readable memory or storage devices. Any references to a function, task, or operation performed by an "engine" or "module" can also refer to one or more processors of a device or server programmed to execute such program code to perform the function, task, or operation.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:

1. A method of detecting a bus lane moving violation, comprising:

capturing, using one or more cameras of an edge device, one or more videos comprising a plurality of video frames showing a vehicle located in a bus lane;

inputting the video frames to an object detection deep learning model running on the edge device to detect the vehicle and bound the vehicle shown in each of the video frames in a vehicle bounding polygon;

determining a trajectory of the vehicle in an image space of the video frames;

transforming the trajectory of the vehicle in the image space into a trajectory of the vehicle in a GPS space;

inputting the trajectory of the vehicle in the GPS space to a vehicle movement classifier to yield at least a movement class prediction and a class confidence score; and evaluating the class confidence score against a predetermined threshold based on the movement class prediction to determine whether the vehicle was moving when located in the bus lane.

2. The method of claim 1, further comprising transforming the trajectory of the vehicle in the image space into the trajectory of the vehicle in the GPS space using, in part, a homography matrix.

3. The method of claim 2, wherein the homography matrix is a camera-to-GPS homography matrix that outputs an estimated distance to the vehicle from the edge device in the GPS space, and wherein the method further comprises adding the estimated distance to the vehicle to GPS coordinates of the edge device to determine GPS coordinates of the vehicle.

4. The method of claim 1, wherein the class confidence score is a numerical score between 0 and 1.0.

5. The method of claim 1, wherein the movement class prediction is a vehicle stationary class.

6. The method of claim 5, wherein the predetermined threshold is a stopped threshold.

7. The method of claim 6, further comprising automatically determining that the vehicle was not moving in response to the class confidence score being higher than the stopped threshold.

8. The method of claim 1, wherein the movement class prediction is a vehicle moving class.

9. The method of claim 8, wherein the predetermined threshold is a moving threshold.

10. The method of claim 9, further comprising automatically determining that the vehicle was moving in response to the class confidence score being higher than the moving threshold.

11. The method of claim 1, wherein the vehicle movement classifier is a neural network.

12. The method of claim 11, wherein the vehicle movement classifier is a recurrent neural network.

13. The method of claim 12, wherein the recurrent neural network is a bidirectional long short-term memory (LSTM) network.

14. The method of claim 1, wherein the one or more videos are captured by an event camera of the edge device coupled to a carrier vehicle while the carrier vehicle is in motion.

15. The method of claim 1, further comprising associating vehicle bounding polygons of the vehicle across multiple video frames using a multi-object tracker prior to determining the trajectory of the vehicle in the image space.

16. The method of claim 15, further comprising replacing any of the vehicle bounding polygons with a replacement vehicle bounding polygon if any part of the vehicle bounding polygon touches a bottom edge or a right edge of the video frame, wherein the replacement vehicle bounding polygon is a last instance of the vehicle bounding polygon that does not touch the bottom edge or the right edge of the video frame.

17. The method of claim 1, further comprising:

inputting the video frames to a lane segmentation deep learning model to bound a plurality of lanes of a roadway detected from the video frames in a plurality of polygons, and wherein at least one of the polygons is a lane-of-interest (LOI) polygon bounding the bus lane; and determining that the vehicle was located in the bus lane based in part on an overlap of at least part of the vehicle bounding polygon and at least part of the LOI polygon.

18. The method of claim 1, wherein a midpoint along a bottom of the vehicle bounding polygon is used to represent the vehicle when transforming the vehicle from the image space into the GPS space.

19. A device for detecting a bus lane moving violation, comprising:

one or more cameras configured to capture one or more videos comprising a plurality of video frames showing a vehicle located in a bus lane; and one or more processors programmed to:

input the video frames to an object detection deep learning model running on the device to detect the vehicle and bound the vehicle shown in each of the video frames in a vehicle bounding polygon;

determine a trajectory of the vehicle in an image space of the video frames;

transform the trajectory of the vehicle in the image space into a trajectory of the vehicle in a GPS space;

input the trajectory of the vehicle in the GPS space to a vehicle movement classifier to yield at least a movement class prediction and a class confidence score; and evaluate the class confidence score against a predetermined threshold based on the movement class prediction to determine whether the vehicle was moving when located in the bus lane.

20. One or more non-transitory computer-readable media comprising instructions stored thereon, that when executed by one or more processors, cause the one or more processors to perform operations comprising:

inputting video frames of one or more videos to an object detection deep learning model to detect a vehicle and bound the vehicle shown in each of the video frames in a vehicle bounding polygon, wherein the video frames show the vehicle located in a bus lane;

determining a trajectory of the vehicle in an image space of the video frames;

transforming the trajectory of the vehicle in the image space into a trajectory of the vehicle in a GPS space;

inputting the trajectory of the vehicle in the GPS space to a vehicle movement classifier to yield at least a movement class prediction and a class confidence score; and evaluating the class confidence score against a predetermined threshold based on the movement class prediction to determine whether the vehicle was moving when located in the bus lane.

21. A system for detecting a bus lane moving violation, comprising:

an edge device comprising one or more cameras configured to capture one or more videos comprising a plurality of video frames showing a vehicle located in a bus lane and one or more processors programmed to input the video frames to an object detection deep learning model running on the device to detect the vehicle and bound the vehicle shown in each of the video frames in a vehicle bounding polygon; and a server comprising one or more processors programmed to:

determine a trajectory of the vehicle in an image space of the video frames, wherein the video frames are received from the edge device;

transform the trajectory of the vehicle in the image space into a trajectory of the vehicle in a GPS space;

input the trajectory of the vehicle in the GPS space to a vehicle movement classifier running on the server to yield at least a movement class prediction and a class confidence score; and evaluate the class confidence score against a predetermined threshold based on the movement class prediction to determine whether the vehicle was moving when located in the bus lane.

22. A method of detecting a bus lane moving violation, comprising:

capturing, using one or more cameras of an edge device, one or more videos comprising a plurality of video frames showing a vehicle located in a bus lane;

inputting the video frames to an object detection deep learning model running on the edge device to detect the vehicle and bound the vehicle shown in each of the video frames in a vehicle bounding polygon;

determining a trajectory of the vehicle;

inputting the trajectory of the vehicle to a vehicle movement classifier to yield predictions concerning three movement classes and a class confidence score associated with each of the three movement classes;

selecting a highest class confidence score out of the three class confidence scores; and evaluating the highest class confidence score against a predetermined threshold to determine whether the vehicle was moving when located in the bus lane.

* * * * *